US010430414B2

(12) United States Patent
Chang et al.

(10) Patent No.: US 10,430,414 B2
(45) Date of Patent: Oct. 1, 2019

(54) METHOD AND APPARATUS FOR SHARING ENVIRONMENT CONTEXT

(71) Applicant: Huawei Technologies Co., Ltd., Shenzhen (CN)

(72) Inventors: Heng Chang, Shenzhen (CN); Qian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 15/151,704

(22) Filed: May 11, 2016

(65) Prior Publication Data

US 2016/0253388 A1 Sep. 1, 2016

Related U.S. Application Data

(63) Continuation of application No. PCT/CN2014/081061, filed on Jun. 28, 2014.

(30) Foreign Application Priority Data

Nov. 11, 2013 (CN) .......................... 2013 1 0558058

(51) Int. Cl.
*G06F 16/2455* (2019.01)
*G06F 16/25* (2019.01)
(Continued)

(52) U.S. Cl.
CPC .... *G06F 16/2455* (2019.01); *G06F 16/24575* (2019.01); *G06F 16/252* (2019.01);
(Continued)

(58) Field of Classification Search
CPC . H04L 12/4633; H04L 67/22; G06F 3/04815; G06F 9/465; G06F 21/30; G06F 17/30477; G06F 17/30864
See application file for complete search history.

(56) References Cited

U.S. PATENT DOCUMENTS

2006/0058036 A1 3/2006 Watanabe et al.
2008/0262901 A1 * 10/2008 Banga .............. G06Q 10/06375 705/14.53

(Continued)

FOREIGN PATENT DOCUMENTS

CN 102224744 A 10/2011
CN 102575939 A 7/2012

(Continued)

OTHER PUBLICATIONS

Foreign Communication From a Counterpart Application, European Application No. 14860956.3, Extended European Search Report dated Sep. 20, 2016, 9 pages.

(Continued)

*Primary Examiner* — Angelica Ruiz
(74) *Attorney, Agent, or Firm* — Conley Rose, P.C.

(57) ABSTRACT

Embodiments of the present disclosure provide a method and an apparatus for sharing an environment context. When an environment context of a first user is lacking, a context awareness platform can acquire an environment context of a second user adjacent to a first user, and provide, to the first user for accessing an application device such that when a user accesses an application in non-smart space or different smart space, the user can also obtain an environment context lacked by the user, and therefore the embodiments of the present disclosure have strong commonality.

15 Claims, 7 Drawing Sheets

(51) Int. Cl.

| | |
|---|---|
| ***G06F 16/2457*** | (2019.01) |
| ***H04L 29/08*** | (2006.01) |
| ***H04W 4/38*** | (2018.01) |
| ***H04W 4/80*** | (2018.01) |
| ***H04W 4/04*** | (2009.01) |

(52) U.S. Cl.

CPC ............. *H04L 67/10* (2013.01); *H04W 4/043* (2013.01); *H04W 4/38* (2018.02); *H04L 67/12* (2013.01); *H04W 4/80* (2018.02)

(56) References Cited

U.S. PATENT DOCUMENTS

| | | | | |
|---|---|---|---|---|
| 2009/0157804 | A1* | 6/2009 | McColgan | H04L 12/1818 709/203 |
| 2010/0070626 | A1* | 3/2010 | McColgan | H04W 4/02 709/224 |
| 2010/0131265 | A1 | 5/2010 | Liu et al. | |
| 2011/0081919 | A1 | 4/2011 | Das et al. | |
| 2011/0201280 | A1 | 8/2011 | Dolfini et al. | |
| 2011/0246438 | A1 | 10/2011 | Sathish | |
| 2011/0312345 | A1 | 12/2011 | Nam | |
| 2012/0124136 | A1* | 5/2012 | Kim | H04W 4/021 709/204 |
| 2012/0166432 | A1* | 6/2012 | Tseng | G06F 17/30867 707/728 |
| 2012/0246074 | A1 | 9/2012 | Annamalai et al. | |
| 2012/0317652 | A1* | 12/2012 | Kiley | H04W 4/02 726/27 |
| 2013/0005255 | A1 | 1/2013 | Pering et al. | |
| 2013/0125008 | A1* | 5/2013 | Irvine | G06F 3/0482 715/739 |
| 2013/0145024 | A1* | 6/2013 | Cao | H04L 67/22 709/224 |
| 2015/0334077 | A1* | 11/2015 | Feldman | H04L 51/32 715/744 |
| 2016/0029155 | A1* | 1/2016 | Kerr | H04W 4/02 455/456.3 |

FOREIGN PATENT DOCUMENTS

| | | | |
|---|---|---|---|
| CN | 102740228 | A | 10/2012 |
| CN | 102939604 | A | 2/2013 |
| JP | 2012005119 | A | 1/2012 |
| WO | 2004068826 | A1 | 8/2004 |

OTHER PUBLICATIONS

Foreign Communication From a Counterpart Application, PCT Application No. PCT/CN2014/081061, English Translation of International Search Report dated Sep. 30, 2014, 2 pages.

Foreign Communication From a Counterpart Application, PCT Application No. PCT/CN2014/081061, English Translation of Written Opinion dated Sep. 30, 2014, 9 pages.

Partial English Translation and Abstract of Chinese Patent Application No. CN102740228, Aug. 4, 2016, 16 pages.

Machine Translation and Abstract of Japanese Publication No. JP2012005119, Jan. 5, 2012, 21 pages.

Machine Translation and Abstract of Chinese Publication No. CN102224744, Oct. 19, 2011, 15 pages.

Foreign Communication From a Counterpart Application, Chinese Application No. 201310558058.3, Chinese Office Action dated Jul. 5, 2017, 11 pages.

Foreign Communication From a Counterpart Application, Japanese Application No. 2016-529920, Japanese Office Action dated Jul. 18, 2017, 3 pages.

Foreign Communication From a Counterpart Application, Japanese Application No. 2016-529920, English Translation of Japanese Office Action dated Jul. 18, 2017, 3 pages.

Foreign Communication From a Counterpart Application, Korean Application No. 10-2016-7014032, Korean Office Action dated Sep. 11, 2017, 6 pages.

Foreign Communication From a Counterpart Application, Korean Application No. 10-2016-7014032, Korean Office Action dated Sep. 22, 2017, 8 pages.

* cited by examiner

METHOD AND APPARATUS FOR SHARING ENVIRONMENT CONTEXT

CROSS-REFERENCE TO RELATED APPLICATION

This application is a continuation of International Application No. PCT/CN2014/081061, filed on Jun. 28, 2014, which claims priority to Chinese Patent Application No. 201310558058.3, filed on Nov. 11, 2013, both of which are hereby incorporated by reference in their entireties.

TECHNICAL FIELD

The present disclosure relates to the field of communications, and in particular, to a method and an apparatus for sharing an environment context.

BACKGROUND

An environment context refers to information used to describe an environment in which user equipment is located, for example, information about the environment such as a geographic location of the user equipment, temperature, humidity, air pressure, noise, pollution, an activity that is carried out, or resource availability. Currently, environment context collection is a key technology for implementing mobile office. Due to diversity of terminal devices, different terminal devices have different sensors. Therefore, a single terminal device cannot satisfy requirements of various applications on environment contexts.

Smart space may provide various data and services to a user. The smart space is space in which a computer device, an information device, and multiple types of sensing apparatuses are embedded. A user located in the smart space performs communication with a server of the smart space using a specific control device or installing a corresponding interaction control program or physical hardware on a device such as a mobile phone, and can obtain various data and services of the smart space conveniently. For example, when the user located in the smart space accesses an application, if a certain or some environment contexts are lacking, but the smart space has a sensing apparatus that provides the environment context, the user can obtain, by interacting with the smart space using the device, the environment context lacked by the user, and provide the environment context to a corresponding application device. The application device executes the application according to the obtained environment context of the user, and sends an execution result to the user.

However, the smart space is fixed physical space and is irremovable. Currently, the actually applied smart space is also very limited. When a user located in non-smart space accesses an application, the user cannot obtain an environment context lacked by the user. In addition, currently, there is no universal smart space interaction control program or physical hardware, and different interaction control programs and different physical hardware are required for communicating with servers of different smart space. Therefore, providing, based on the smart space, an environment context lacked by user equipment, has a great limitation.

SUMMARY

Embodiments of the present disclosure provide a method and an apparatus for sharing an environment context such that when a user accesses an application in non-smart space, the user can also acquire an environment context lacked by the user, and therefore, the embodiments of the present disclosure have strong commonality.

To achieve the foregoing objective, the following technical solutions are used in the embodiments of the present disclosure:

According to a first aspect, an embodiment of the present disclosure provides a context awareness platform, including a receiving unit configured to receive a request for acquiring an environment context of a first user, where the request is initiated by an application device and includes an identifier of the first user and an environment context identifier, a querying unit configured to find an environment context record of the first user according to the identifier of the first user, query, in the environment context record of the first user, an environment context corresponding to the environment context identifier, and when finding that the environment context corresponding to the environment context identifier is lacking, trigger an acquiring unit to process, the acquiring unit configured to acquire, according to the environment context identifier, an environment context of a second user adjacent to the first user, and a sending unit configured to return the environment context acquired by the acquiring unit to the application device.

With reference to the first aspect, in a first possible implementation manner of the first aspect, the acquiring unit includes an interaction module configured to determine a user adjacent to the first user, a search module configured to perform a search using the environment context identifier, in an environment context record of the user that is determined by the interaction module and adjacent to the first user, and an acquiring module configured to acquire, from an environment context record of the second user, the environment context corresponding to the environment context identifier after the search module finds that the second user adjacent to the first user has the environment context corresponding to the environment context identifier.

With reference to the first possible implementation manner of the first aspect, in a second possible implementation manner of the first aspect, the acquiring unit further includes an authentication module configured to determine whether the second user sets environment context sharing, where the acquiring module is configured to execute the operation of acquiring, from the context record of the second user, the environment context corresponding to the environment context identifier after the search module finds that the second user adjacent to the first user has the environment context corresponding to the environment context identifier and the authentication module determines that the second user sets environment context sharing.

With reference to the first aspect or the second possible implementation manner of the first aspect, in a third possible implementation manner of the first aspect, the acquiring unit further includes an adjacency determining module configured to confirm authenticity of adjacency of the first user and the second user, where the acquiring module is configured to execute the operation of acquiring, from an environment context record of the second user, the environment context corresponding to the environment context identifier after the search module finds that the second user adjacent to the first user has the environment context corresponding to the environment context identifier and the adjacency determining module confirms that the first user and the second user are really adjacent.

With reference to the third possible implementation manner of the first aspect, in a fourth possible implementation manner of the first aspect, the adjacency determining module is configured to request, from the second user, information about a user adjacent to the second user, receive the information that is returned by the second user and about the user adjacent to the second user, and determine whether the information returned by the second user includes information about the first user, and if the information returned by the second user includes information about the first user, determine that the first user and the second user are really adjacent, or if the information returned by the second user does not include information about the first user, determine that the first user and the second user are not adjacent.

With reference to the first aspect, in a fifth possible implementation manner of the first aspect, the acquiring unit is configured to send, to the first user, a notification indicating that the environment context of the first user is lacking, where the notification carries the environment context identifier, and receive the environment context that is acquired from the second user by the first user after reception of the notification and corresponding to the environment context identifier.

With reference to the first aspect or any one of the first possible implementation manner to the fifth possible implementation manner of the first aspect, in a sixth possible implementation manner of the first aspect, the context awareness platform further includes a saving unit configured to save the acquired environment context of the second user to the environment context record of the first user as a temporary environment context of the first user, and set a validity period for the temporary environment context.

According to a second aspect, an embodiment of the present disclosure provides user equipment, including a receiving unit configured to receive a notification from a context awareness platform, and when identifying that the notification is a notification indicating that an environment context is lacking, trigger a search unit to process, the search unit configured to search for a device adjacent to the user equipment, and a service unit configured to acquire the lacking environment context from the adjacent device that is searched out by the search unit, and send the acquired environment context to the context awareness platform as an environment context of the user equipment, or configured to acquire, from the search unit, identifier information of the adjacent device that is searched out, and send the identifier information to the context awareness platform such that the context awareness platform acquires the lacking environment context from an environment context record of a user corresponding to the identifier information.

With reference to the second aspect, in a first possible implementation manner of the second aspect, the notification carries an environment context identifier, and when the service unit is configured to acquire the lacking environment context from the adjacent device that is searched out by the search unit, the service unit includes a requesting module configured to initiate an environment context sharing request to the adjacent device that is searched out, where the environment context sharing request carries the environment context identifier, a receiving module configured to receive an environment context that is returned by the adjacent device and corresponding to the environment context identifier, and a feedback module configured to send the environment context received by the receiving module to the context awareness platform as the environment context of the user equipment.

With reference to the second aspect, in a second possible implementation manner of the second aspect, when the service unit is configured to send the identifier information of the adjacent device that is searched out by the search unit to the context awareness platform, the service unit includes an acquiring module configured to acquire, from the search unit, the identifier information of the adjacent device that is searched out, a generation module configured to arrange the acquired identifier information according to a preset rule, and generate an ordered adjacent user table including the identifier information, and a sending module configured to send the adjacent user table to the context awareness platform.

According to a third aspect, an embodiment of the present disclosure provides a method for sharing an environment context, where the method includes receiving, by a context awareness platform, a request for acquiring an environment context of a first user, where the request is initiated by an application device and includes an identifier of the first user and an environment context identifier, finding an environment context record of the first user according to the identifier of the first user, and querying, in the environment context record of the first user, an environment context corresponding to the environment context identifier, when finding that the environment context corresponding to the environment context identifier is lacking, acquiring, according to the environment context identifier, an environment context of a second user adjacent to the first user, and returning the acquired environment context to the application device.

With reference to the third aspect, in a first possible implementation manner of the third aspect, the acquiring, according to the environment context identifier, an environment context of a second user adjacent to the first user, includes determining, by the context awareness platform, a user adjacent to the first user, performing a search using the environment context identifier, in an environment context record of the user adjacent to the first user, and when finding that the second user adjacent to the first user has the environment context corresponding to the environment context identifier, acquiring, from an environment context record of the second user, the environment context corresponding to the environment context identifier.

With reference to the first possible implementation manner of the third aspect, in a second possible implementation manner of the third aspect, before the acquiring, from the environment context record of the second user, the environment context corresponding to the environment context identifier, the method further includes determining, by the context awareness platform, whether the second user sets environment context sharing, and after determining that the second user sets environment context sharing, executing the operation of acquiring, from the environment context record of the second user, the environment context corresponding to the environment context identifier.

With reference to the first possible implementation manner of the third aspect or the second possible implementation manner of the third aspect, in a third possible implementation manner of the third aspect, before the acquiring, from the environment context record of the second user, the environment context corresponding to the environment context identifier, the method further includes confirming, by the context awareness platform, authenticity of adjacency of the first user and the second user, and after confirming that the first user and the second user are really adjacent, executing the operation of acquiring, from the environment context record of the second user, the environment context corresponding to the environment context identifier.

With reference to the second possible implementation manner of the third aspect, in a fourth possible implementation manner of the third aspect, the confirming, by the context awareness platform, authenticity of adjacency of the first user and the second user, includes requesting, by the context awareness platform, from the second user, information about a user adjacent to the second user, receiving the information that is returned by the second user and about the user adjacent to the second user, and determining, by the context awareness platform, whether the information returned by the second user includes information about the first user, and if the information returned by the second user includes information about the first user, determining that the first user and the second user are really adjacent, or if the information returned by the second user does not include information about the first user, determining that the first user and the second user are not adjacent.

With reference to the third aspect, in a fifth possible implementation manner of the third aspect, the acquiring, according to the environment context identifier, an environment context of a second user adjacent to the first user, includes sending, by the context awareness platform, to the first user, a notification indicating that the environment context of the first user is lacking, where the notification carries the environment context identifier, and receiving, by the context awareness platform, the environment context that is acquired from the second user by the first user after reception of the notification and corresponding to the environment context identifier.

With reference to the fifth possible implementation manner of the third aspect, in a sixth possible implementation manner of the third aspect, the receiving, by the context awareness platform, the environment context that is acquired from the second user by the first user after reception of the notification and corresponding to the environment context identifier, includes searching, by the first user, for a user adjacent to the first user after reception of the notification, initiating an environment context sharing request to the adjacent user that is searched out, where the environment context sharing request carries the environment context identifier, receiving the environment context that is returned by the second user adjacent to the first user and corresponding to the environment context identifier, and returning the received environment context to the context awareness platform.

With reference to the third aspect or any one of the first possible implementation manner of the third aspect to the fifth possible implementation manner of the third aspect, in a seventh possible implementation manner of the third aspect, the method further includes saving, by the context awareness platform, the acquired environment context of the second user to the environment context record of the first user as a temporary environment context of the first user, and setting a validity period for the temporary environment context.

According to a fourth aspect, an embodiment of the present disclosure provides a method for sharing an environment context, where the method includes receiving, by user equipment, a notification from a context awareness platform, when the notification indicates that an environment context is lacking, searching for a device adjacent to the user equipment, and acquiring, by the user equipment, the lacking environment context from the adjacent device that is searched out, and sending the acquired environment context to the context awareness platform as an environment context of the user equipment, or sending, by the user equipment, identifier information of the adjacent device that is searched out to the context awareness platform such that the context awareness platform acquires the lacking environment context from an environment context record corresponding to the identifier information.

With reference to the fourth aspect, in a first possible implementation manner of the fourth aspect, the notification carries an environment context identifier, and the acquiring, by the user equipment, the lacking environment context from the adjacent device that is searched out, includes initiating, by the user equipment, an environment context sharing request to the adjacent device that is searched out, where the environment context sharing request carries the environment context identifier, and receiving, by the user equipment, an environment context that is returned by the adjacent device and corresponding to the environment context identifier.

With reference to the fourth aspect, in a second possible implementation manner of the fourth aspect, the sending, by the user equipment, identifier information of the adjacent device that is searched out to the context awareness platform, includes acquiring, by the user equipment, the identifier information of the adjacent device that is searched out, arranging the acquired identifier information according to a preset rule, and generating an ordered adjacent user table including the identifier information, and sending the adjacent user table to the context awareness platform.

A context awareness platform in the embodiments of the present disclosure can acquire an environment context of a second user adjacent to a first user, and provide, to the first user, an environment context lacked by the first user for accessing an application device such that the user in non-smart space can also acquire the environment context lacked by the user, and therefore, the embodiments of the present disclosure have strong commonality.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

An environment context is information about an environment in which user equipment is located, such as a geographic location, temperature, humidity, air pressure, noise, pollution, a scenario in which the user equipment is located, and resource availability. The information about the environment has a feature of commonality in a short range. That is, environment contexts of adjacent users generally have a same value. Therefore, the embodiments of the present disclosure provide a solution for sharing an environment context between adjacent users, to reduce a limitation on acquisition of an environment context. It should be noted that, the environment mentioned in the embodiments of the present disclosure refer to an external condition of an area in which a user is located and may include a natural condition or may include other conditions such as a scenario in which the user is located and resource availability.

Figure 1:
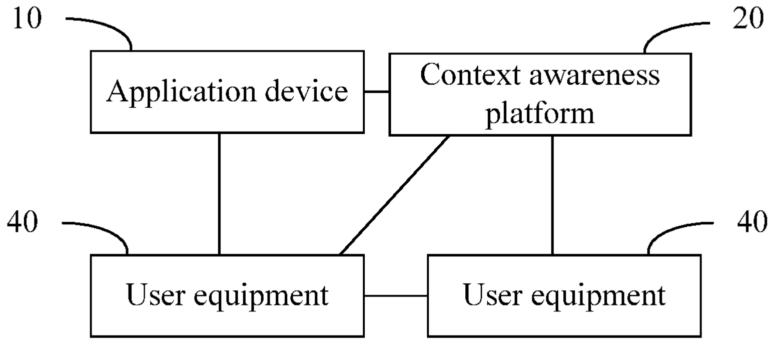
FIG. 1 is a schematic structural diagram of a system for sharing an environment context according to an embodiment of the present disclosure.

FIG. 1 is a structural diagram of a system for sharing an environment context according to an embodiment of the present disclosure. The system includes a context awareness platform 20, an application device 10, and a user equipment 40.

The context awareness platform 20 is responsible for maintaining an environment context record of a user and providing a function for querying the environment context. The application device 10 may query an environment context of a user from the context awareness platform 20.

The application device 10, functionally as a third party, may exist independently, or may be configured in the context awareness platform 20, and may execute a corresponding application based on acquired environment context information, and send an execution result to the user equipment 40.

The user equipment 40 is a device used by the user to perform communication with the context awareness platform 20 or another user equipment 40, and may be a terminal device such as a mobile phone. Multiple user equipment 40 may belong to one user. The user equipment 40 may collect environment context information based on various sensors in the user equipment, and send the collected environment context information to the context awareness platform 20. The context awareness platform 20 maintains the environment context information to support queries for the environment context information. It should be noted that user operations involved in this embodiment of the present disclosure are all implemented by a device used by the user.

When the context awareness platform 20 provides the environment context of the user to the application device 10, if it is found that the environment context of the user is lacking, the context awareness platform 20 acquires an environment context of a user adjacent to the user and provides the acquired environment context to the application device 10. If an environment context is not found in an environment context record of a user, the context awareness platform 20 acquires an environment context of a user adjacent to the user and provides the acquired environment context to the application device 10.

The context awareness platform 20 may acquire the environment context of the adjacent user in the following two manners:

Manner 1: The context awareness platform 20 sends, to the user equipment 40 used by the user of which the environment context lacks, a notification indicating that the environment context is lacking. After receiving the notification, the user equipment 40 searches for a user adjacent to the user, and provides information about the adjacent user to the context awareness platform 20. The context awareness platform 20 acquires the lacking environment context from an environment context record of the adjacent user.

Manner 2: The context awareness platform 20 sends, to the user equipment 40 used by the user of which the environment context lacks, a notification indicating that the environment context is lacking, and an identifier of the lacking environment context is carried in the notification. After receiving the notification, the user equipment 40 searches for a user adjacent to the user equipment 40. For example, the user equipment 40 may search for an adjacent user using a short-range communications technology, acquire the lacking environment context from the adjacent user that is searched out, and send the acquired environment context to the context awareness platform 20.

In this embodiment of the present disclosure, a context awareness platform is added for maintaining an environment context of a user such that an application device may query the environment context of the user from the context awareness platform. Moreover, when the environment context of the user is lacking, the context awareness platform can acquire an environment context of another user in a same environment as the user. Therefore, environment context sharing between adjacent devices is implemented, a lack of environment context information of a single device is supplemented, and a limitation on implementation of a context awareness application is reduced.

Figure 2:
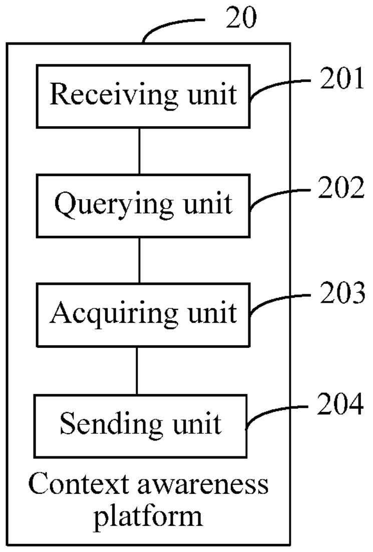
FIG. 2 is a schematic structural diagram of a context awareness platform according to an embodiment of the present disclosure.

FIG. 2 is a schematic structural diagram of a context awareness platform 20 according to an embodiment of the present disclosure. As shown in FIG. 2, the context awareness platform 20 may include a receiving unit 201, a querying unit 202, an acquiring unit 203, and a sending unit 204.

The receiving unit 201 is configured to receive a request for acquiring an environment context of a first user, where the request is initiated by an application device and includes an identifier of the first user and an environment context identifier.

The first user may access the application device using user equipment of the first user. The application device may send the request for acquiring the environment context of the first user to the context awareness platform. The request includes the identifier of the first user and the environment context identifier.

An identifier of a user is identification information used to distinguish different users, and may uniquely identify a user in the context awareness platform. The identifier of the user may be in different forms, including but not limited to an identifier of user equipment used by the user to perform an interaction with the context awareness platform (for example, a Media Access Control (MAC) address of the user equipment), or a user name that cannot be duplicated (for example, an electronic mail (E-mail) address of the user), or a Radio Frequency Identification (RFID), or the like. The user may be in different forms of user identifiers to access the context awareness platform. In this case, the context awareness platform may save correspondence between different forms of user identifiers of each user. For example, when the context awareness platform uses an E-mail address of each user to organize an environment context record of the user, the context awareness platform may further save a correspondence between the E-mail of the user and a MAC address of user equipment used by the user. In this way, when the user uses the MAC address of the user equipment to perform access, the context awareness platform may find, according to the correspondence, the E-mail address corresponding to the MAC address of the user equipment in order to find the environment context record corresponding to the E-mail address. A person skilled in the art may understand that the foregoing forms are only implementation forms of user identifiers, and that a user may be distinguished using different types of identifiers.

Similarly, the environment context identifier is used to distinguish different types of environment contexts, and generally may be directly indicated by an environment context type, for example, a Global Positioning System (GPS), humidity, temperature, height, air pressure, noise or the like.

Therefore, it can be known from the foregoing that, the request for acquiring the environment context of the first user may indicate, to the context awareness platform, which environment context of which user is requested by the application device.

The querying unit 202 is configured to find an environment context record of the first user according to the identifier of the first user, query, in the environment context record of the first user, an environment context corresponding to the environment context identifier, and when finding that the environment context corresponding to the environment context identifier is lacking, trigger the acquiring unit 203 to process.

The environment context record of each user may include an identifier of the user, an environment context identifier, and an environment context corresponding to the environment context identifier. The environment context record of the user may be saved in a database or a file, which is not limited by this embodiment of the present disclosure.

It should be noted that the environment context record of the user may be collected and recorded by the context awareness platform beforehand. A collection manner may be that the context awareness platform queries the user equipment regularly, or may be that the user equipment reports to the context awareness platform regularly.

It should be noted that, smart space may be used as a special type of user managed by the context awareness platform, where an awareness device in the smart space may send an acquired environment context to the context awareness platform, and the context awareness platform may generate an environment context record of the smart space.

The querying unit 202 may query the environment context record of the first user according to the user identifier in the request, and further query, in the environment context record of the first user, the environment context corresponding to the environment context identifier in the request.

The acquiring unit 203 is configured to acquire, according to the environment context identifier, an environment context of a second user adjacent to the first user.

Exemplarily, if the querying unit 202 finds that the environment context corresponding to the environment context identifier in the request, in the environment context record of the first user, is lacking, or not found, the querying unit 202 indicates that the user equipment of the first user does not send the environment context corresponding to the environment context identifier to the context awareness platform. In this case, the acquiring unit 203 may acquire the environment context of the second user adjacent to the first user.

The sending unit 204 is configured to return the environment context acquired by the acquiring unit 203 to the application device.

The sending unit 204 returns the acquired environment context to the application device. The application device may execute a corresponding application using the environment context, and return an execution result to the user equipment of the first user.

The acquiring unit 203 may acquire the environment context of the second user adjacent to the first user in two manners, which are described separately hereinafter.

I. First Manner:

The following processes may be included:

1. The acquiring unit 203 sends, to the first user, a notification indicating that the environment context of the first user is lacking, where the notification carries the environment context identifier.

The environment context identifier carried in the notification is an identifier of an environment context lacked by the first user.

After receiving the notification, the user equipment of the first user may search for a device adjacent to the user equipment of the first user, for example, may acquire, using a short-range communications technology, an identifier of an adjacent device in a same environment as the user equipment of the first user, where the short-range communications technology includes but is not limited to technologies such as Bluetooth, WIFI, and Near Field Communication (NFC).

After searching out the adjacent device, the user equipment of the first user initiates an environment context sharing request to the adjacent device that is searched out. The environment context sharing request carries the environment context identifier received from the context awareness platform. The user equipment of the first user may send, using the short-range communications technology, the environment context sharing request to the device adjacent to the first user.

The device that receives the environment context sharing request determines, according to the environment context identifier carried in the request, whether the device has the environment context corresponding to the environment context identifier.

If it is determined that the device does not have the environment context corresponding to the environment context identifier, the request is ignored.

If it is determined that the device has the environment context corresponding to the environment context identifier, the environment context corresponding to the environment context identifier may be sent to the user equipment of the first user.

For ease of description, in this embodiment of the present disclosure, an adjacent user providing an environment context to the first user is referred to as a second user. Then, an adjacent device providing an environment context to the first user is a device used by the second user.

2. The acquiring unit 203 receives the environment context that is acquired from the second user by the first user after reception of the notification and corresponding to the environment context identifier.

After the device of the second user that is searched out determines that the device has the environment context corresponding to the received environment context identifier, the device sends the environment context corresponding to the environment context identifier to the user equipment of the first user. The user equipment of the first user sends the received environment context to the acquiring unit 203 of the context awareness platform.

Figure 3:
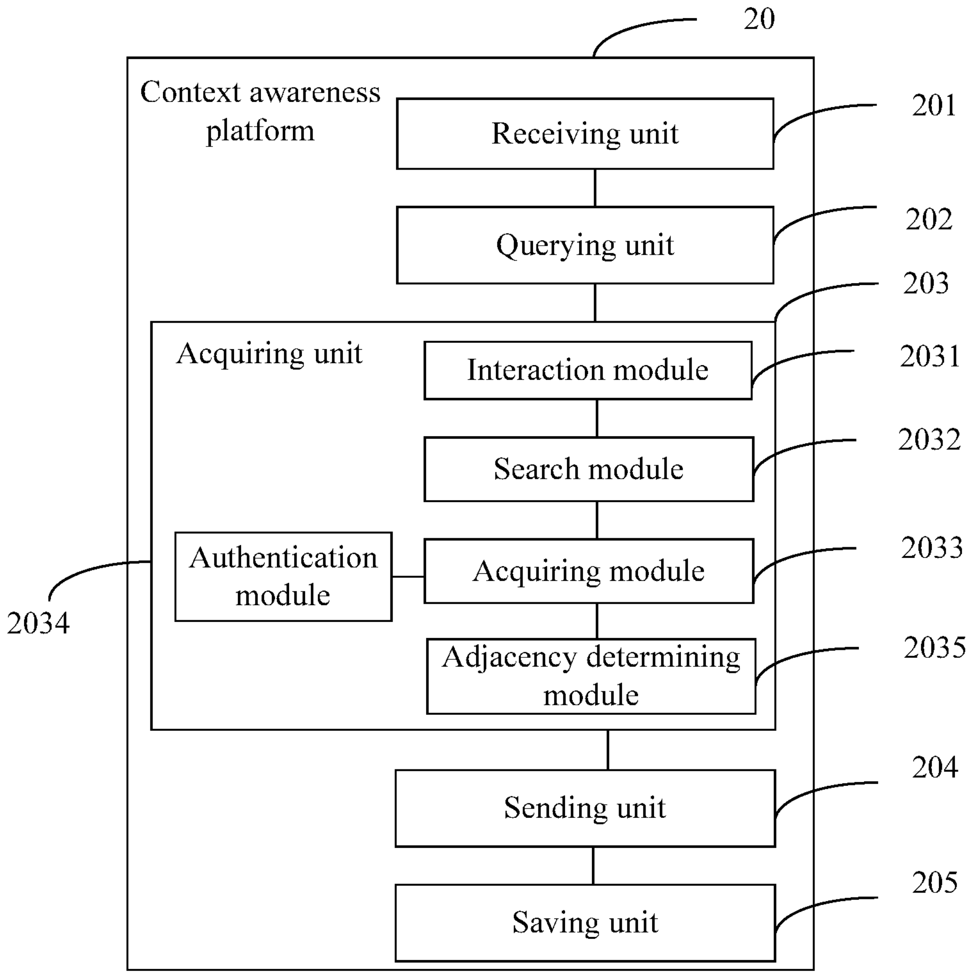
FIG. 3 is a schematic structural diagram of a context awareness platform according to another embodiment of the present disclosure.

II. Second Manner:

The following process may be included: The acquiring unit 203 determines a user adjacent to the first user, performs a search using the environment context identifier carried in the request sent by the application device, in an environment context record of the user adjacent to the first user, and after finding that the second user adjacent to the first user has the environment context corresponding to the environment context identifier, acquires, from a context record of the second user, the environment context corresponding to the environment context identifier. As shown in FIG. 3, the acquiring unit 203 may further include an interaction module 2031, a search module 2032, and an acquiring module 2033.

The interaction module 2031 is configured to determine a user adjacent to the first user.

Exemplarily, the process may be implemented in the following manner:

The interaction module 2031 sends, to the first user, a notification indicating that the environment context of the first user is lacking, and receives information that is returned by the first user after reception of the notification and about the user adjacent to the first user. The information about the user adjacent to the first user may be an identifier of a device used by the adjacent user.

After receiving the notification, the user equipment of the first user may search for a device adjacent to the user equipment using a short-range communications technology, and return an identifier of the adjacent device that is searched out to the interaction module 2031, for example, return a MAC address of the adjacent device that is searched out to the interaction module 2031. The short-range communications technology includes but is not limited to technologies such as Bluetooth, WIFI, and NFC.

When there are multiple adjacent devices that are searched out, identifiers of the adjacent devices that are searched out may be returned in a form of a list to the interaction module 2031. For example, the user equipment of the first user may sort, according to a preset rule, the adjacent devices that are searched out, and generate an adjacent user table of the first user. The preset rule may include but is not limited to signal strengths, physical distances, and the like. It is assumed that the user equipment of the first user searches out two adjacent devices, where identifiers (MAC addresses are used as an example herein) of the adjacent devices that are searched out are respectively 80:b6:86:28:7a:c4 and 00:1c:a4:55:b6:8D. A signal strength of the device with the identifier 80:b6:86:28:7a:c4 is higher than a signal strength of the device with the identifier 00:1c:a4:55:b6:8D. As shown in Table 1, Table 1 is an adjacent user table that is obtained after sorting is performed in descending order of signal strengths.

TABLE 1

| Sequence number | Type | Adjacent user (MAC address of a device used by an adjacent user) |
|---|---|---|
| 1 | Bluetooth | 80:b6:86:28:7a:c4 |
| 2 | Bluetooth | 00:1c:a4:55:b6:8D |

The interaction module 2031 determines the user adjacent to the first user according to the information returned by the first user.

The search module 2032 is configured to perform a search using the environment context identifier, in an environment context record of the user adjacent to the first user.

It should be noted that, if a user identifier used by the context awareness platform for organizing an environment context of the user is the identifier of the device used by the user, the search module 2032 may find a corresponding environment context record of the adjacent user directly according to the identifier of the device that is received by the interaction module 2031.

If the user identifier used by the context awareness platform for organizing the environment context of the user is not the identifier of the device used by the user, for example, an E-mail address is used as the user identifier, the search module 2032 may find, in a prestored correspondence between the user identifier and the identifier of the device used by the user, the user identifier corresponding to the identifier of the device that is received by the interaction module 2031, and then find the corresponding environment context record according to the found user identifier.

For example, the search module 2032 may convert the received identifier of the device of the adjacent user that is sent by the user equipment into the user identifier of the adjacent user according to the correspondence between the user identifier and the identifier of the device used by the user.

For example, the context awareness platform may convert the adjacent user table shown in Table 1 into an adjacent user table expressed using user identifiers. If an identifier of a user corresponding to the user equipment with the MAC address 80:b6:86:28:7a:c4, in the context awareness platform is userb@huawei.com, and an identifier of a user corresponding to the user equipment with the MAC address 00:1 c:a4:55:b6:8D, in the context awareness platform is userc@gmail.com, obtained user identifiers may be shown in Table 2:

TABLE 2

| Sequence number | Adjacent user (EMAIL address) |
|---|---|
| 1 | userb@huawei.com |
| 2 | userc@gmail.com |

The search module 2032 searches for an environment context record corresponding to the user identifier in Table 2, and searches, in the found environment context record, the environment context corresponding to the environment context identifier.

For example, the search module 2032 may sequentially query, according to the order in Table 2, the environment context records of the adjacent users shown in Table 2 for environment contexts corresponding to environment context identifiers.

The acquiring module 2033 is configured to acquire, from a context record of the second user, the environment context corresponding to the environment context identifier after the search module 2032 finds that the second user adjacent to the first user has the environment context corresponding to the environment context identifier.

In another embodiment of the present disclosure, the user may set a sharing permission for the environment context record of the user in the context awareness platform 20, to indicate whether the environment context record can be shared. Therefore, the environment context record of the user may further include the sharing permission.

For example, referring to FIG. 3, the acquiring unit 2033 may further include an authentication module 2034 configured to determine whether the second user sets environment context sharing.

Correspondingly, the acquiring module 2033 is configured to execute the operation of acquiring, from a context record of the second user, the environment context corresponding to the environment context identifier after the search module 2032 finds that the second user adjacent to the first user has the environment context corresponding to the environment context identifier and the authentication module 2034 determines that the second user sets environment context sharing.

In another embodiment of the present disclosure, the context awareness platform 20 may further confirm authenticity of adjacency of the first user and the second user. For example, as shown in FIG. 3, the acquiring unit 203 may further include an adjacency determining module 2035 configured to confirm authenticity of adjacency of the first user and the second user.

Correspondingly, the acquiring module 2033 is configured to execute the operation of acquiring, from a context record of the second user, the environment context corresponding to the environment context identifier after the search module 2032 finds that the second user adjacent to the first user has the environment context corresponding to the environment context identifier and the adjacency determining module 2035 confirms that the first user and the second user are really adjacent.

The adjacency determining module 2035 may confirm authenticity of adjacency of the first user and the second user in the following manners: requesting, from the second user, information about a user adjacent to the second user, receiving the information that is returned by the second user and about the user adjacent to the second user, and determining whether the information returned by the second user includes information about the first user, and if the information returned by the second user includes information about the first user, determining that the first user and the second user are really adjacent, or if the information returned by the second user does not include information about the first user, determining that the first user and the second user are not adjacent.

It should be noted that the authentication module 2034 and the adjacency determining module 2035 are both optional functional modules. When the context awareness platform 20 includes both the authentication module 2034 and the adjacency determining module 2035, the acquiring module 2033 needs to execute the operation of acquiring, from a context record of the second user, the environment context corresponding to the environment context identifier after the authentication module 2034 determines that the second user sets environment context sharing and the adjacency determining module 2035 determines that the first user and the second user are really adjacent. However, execution sequences of the authentication module 2034 and the adjacency determining module 2035 are not limited.

Generally, a motion range of the user within a short time is limited. Therefore, to reduce a quantity of searches for adjacent users and a quantity of interactions with adjacent users, in another embodiment of the present disclosure, as shown in FIG. 3, the context awareness platform 20 may further include: a saving unit 205 configured to save the acquired environment context of the second user to the environment context record of the first user as a temporary environment context of the first user, and set a validity period for the temporary environment context.

It can be known from the foregoing that, a context awareness platform 20 can acquire an environment context of a second user in a same environment as a first user, and provide, to the first user, an environment context lacked by the first user for accessing an application device such that the user may not be limited to smart space when acquiring the environment context lacked by the user, and therefore, this embodiment of the present disclosure has strong commonality.

Figure 4:
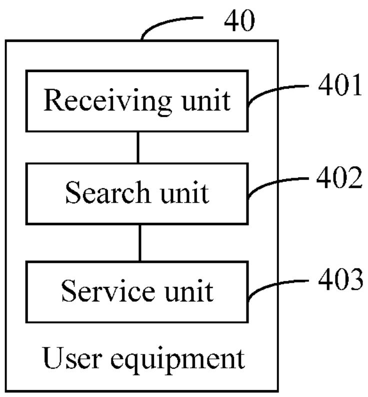
FIG. 4 is a schematic structural diagram of user equipment according to an embodiment of the present disclosure.

FIG. 4 is a schematic structural diagram of user equipment 40 according to an embodiment of the present disclosure. Referring to FIG. 4, the user equipment 40 may include a receiving unit 401, a search unit 402, and a service unit 403.

The receiving unit 401 is configured to receive a notification from a context awareness platform, and when identifying that the notification is a notification indicating that an environment context is lacking, trigger the search unit 402 to process.

For example, if the context awareness platform finds, when querying an environment context record of a first user that an environment context is lacking in the record, the context awareness platform sends, to user equipment of the first user, a notification indicating that the environment context is lacking.

The notification may be implemented by extending an existing PUSH notification, for example, extending a field indicating that the environment context is lacking, in the PUSH notification. A special notification message for lacking of an environment context may be customized.

If the notification is implemented by extending the existing PUSH notification, the receiving unit 401 may identify the notification according to an indication in the extended field. If a customization manner is used, the receiving unit 401 may identify the notification according to a name of a customized message.

The search unit 402 is configured to search for a device adjacent to the user equipment.

For example, the user equipment may acquire an identifier of an adjacent device in a same environment as the user equipment using a short-range communications technology. The short-range communications technology includes but is not limited to technologies such as Bluetooth, WIFI, and NFC.

After searching out the device adjacent to the user equipment, the search unit 402 provides information about the adjacent device to the service unit 403 for processing.

The service unit 403 is configured to acquire the lacking environment context from the adjacent device that is searched out by the search unit 402, and send the acquired environment context to the context awareness platform as an environment context of the user equipment, or configured to send identifier information of the adjacent device that is searched out by the search unit 402 to the context awareness platform such that the context awareness platform acquires the lacking environment context from an environment context record of a user corresponding to the identifier information.

It should be noted that the service unit 403 has two different implementation manners. A person skilled in the art may select either one of the manners in this embodiment of the present disclosure for implementation as required. The following describes the two manners in detail separately using FIG. 5A and FIG. 5B.

Figure 5A:
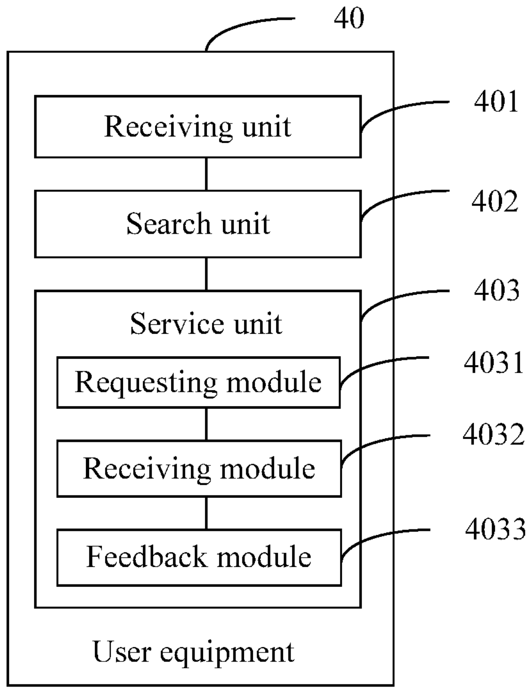
FIG. 5A is a schematic structural diagram of user equipment according to another embodiment of the present disclosure.

As shown in FIG. 5A, when the service unit 403 is configured to acquire the lacking environment context from the adjacent device that is searched out by the search unit 402, the service unit 403 includes a requesting module 4031 configured to initiate an environment context sharing request to the adjacent device that is searched out, where the environment context sharing request carries the environment context identifier, a receiving module 4032 configured to receive an environment context that is returned by the adjacent device and corresponding to the environment context identifier, and a feedback module 4033 configured to send the acquired environment context to the context awareness platform as the environment context of the user equipment.

It should be noted that in the foregoing manner, the notification sent by the context awareness platform to the user equipment 40 needs to carry the environment context identifier.

Figure 5B:
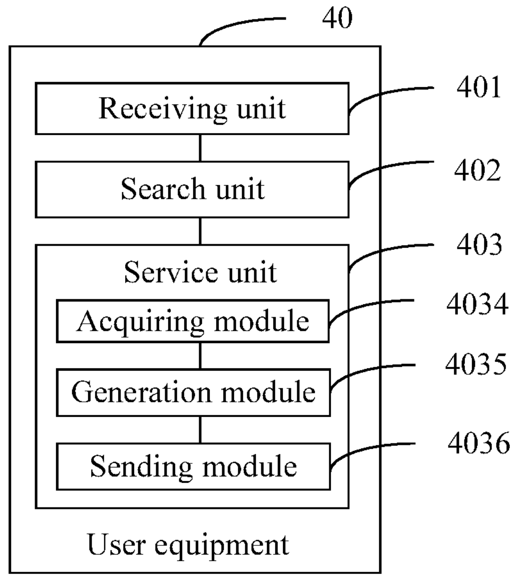
FIG. 5B is a schematic structural diagram of user equipment according to another embodiment of the present disclosure.

As shown in FIG. 5B, when the service unit 403 is configured to send the identifier information of the adjacent device that is searched out by the search unit 402 to the context awareness platform, the service unit 403 includes an acquiring module 4034 configured to acquire, from the search unit 402, the identifier information of the adjacent device that is searched out, a generation module 4035 configured to arrange the acquired identifier information according to a preset rule, and generate an ordered adjacent user table including the identifier information, and a sending module 4036 configured to send the adjacent user table to the context awareness platform.

A MAC address of the adjacent device may be used as the identifier information of the adjacent device. The preset rule may include but is not limited to signal strengths, physical distances, and the like. The adjacent user table generated by the generation module 4035 is not further described herein, and for details, reference may be made to Table 1.

It can be known from the foregoing that, user equipment 40 in this embodiment of the present disclosure may acquire a lacking environment context from an adjacent device in order to provide the lacking environment context to a context awareness platform. Alternatively, user equipment 40 may choose to send identifier information of an adjacent device to a context awareness platform such that the context awareness platform can acquire a lacking environment context from an environment context record of the adjacent device of the user equipment. Therefore, environment context sharing between adjacent users in a same environment is implemented, and a limitation on acquisition of an environment context is reduced.

Figure 6:
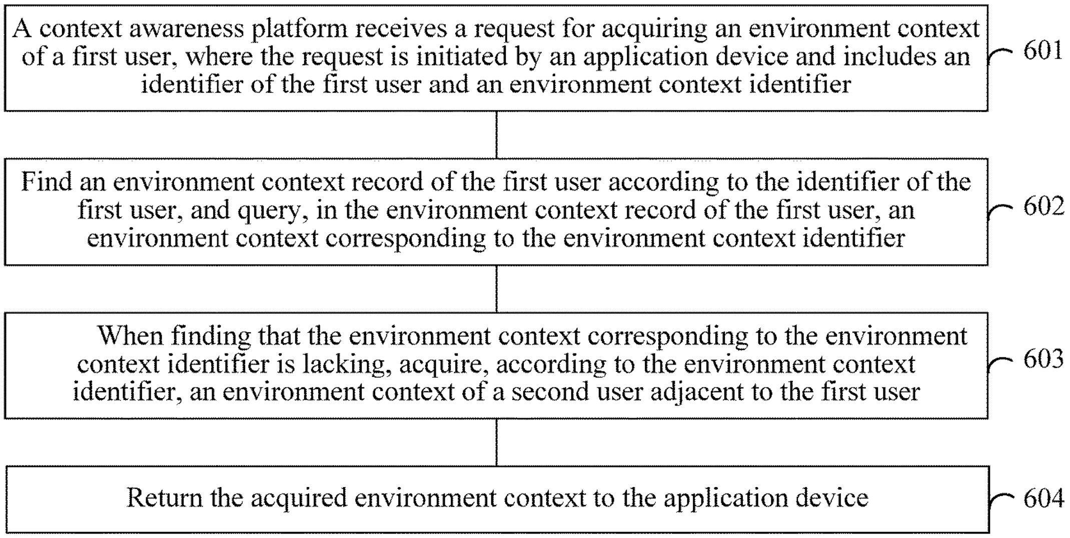
FIG. 6 is a flowchart of a method for sharing an environment context according to an embodiment of the present disclosure.

FIG. 6 shows a method for sharing an environment context according to an embodiment of the present disclosure. Referring to FIG. 6, the method includes:

601. A context awareness platform receives a request for acquiring an environment context of a first user, where the request is initiated by an application device and includes an identifier of the first user and an environment context identifier.

Exemplarily, the first user may access the application device using user equipment of the first user, and the application device may send the request for acquiring the environment context of the first user to the context awareness platform, where the request includes the identifier of the first user and the environment context identifier.

An identifier of a user is identification information used to distinguish different users, and may uniquely identify a user in the context awareness platform. The identifier of the user may be in different forms, including but not limited to an identifier of user equipment used by the user to perform an interaction with the context awareness platform (for example, a MAC address of the user equipment), or a user name that cannot be duplicated (for example, an E-mail address of the user), or a RFID, or the like. The user may be in different forms of user identifiers to access the context awareness platform. In this case, the context awareness platform may save correspondence between different forms of user identifiers of each user. For example, when the context awareness platform uses an E-mail address of each user to organize an environment context record of the user, the context awareness platform may further save a correspondence between the E-mail of the user and a MAC address of user equipment used by the user. In this way, when the user uses the MAC address of the user equipment to perform access, the context awareness platform may find, according to the correspondence, the E-mail address corresponding to the MAC address of the user equipment in order to find the environment context record corresponding to the E-mail address. A person skilled in the art may understand that the foregoing forms are only implementation forms of user identifiers, and that a user may be distinguished using different types of identifiers.

Similarly, the environment context identifier is used to distinguish different types of environment contexts, and generally may be directly indicated by an environment context type, for example, GPS, humidity, temperature, height, air pressure, noise or the like.

Therefore, the request for acquiring the environment context of the first user may indicate, to the context awareness platform, which environment context of which user is requested by the application device.

602. The context awareness platform finds an environment context record of the first user according to the identifier of the first user, and query, in the environment context record of the first user, an environment context corresponding to the environment context identifier.

The environment context record of each user may include an identifier of the user, an environment context identifier, and an environment context corresponding to the environment context identifier. The environment context record of the user may be saved in a database or a file, which is not limited by this embodiment of the present disclosure.

It should be noted that the environment context record of the user may be collected and recorded by the context awareness platform beforehand. A collection manner may be that the context awareness platform queries the user equipment regularly, or may be that the user equipment reports to the context awareness platform regularly.

It should be noted that, smart space may be used as a special type of user managed by the context awareness platform, where an awareness device in the smart space may send an acquired environment context to the context awareness platform, and the context awareness platform may generate an environment context record of the smart space.

The context awareness platform may query the environment context record of the first user according to the user identifier in the request, and further query, in the environment context record of the first user, the environment context corresponding to the environment context identifier in the request.

603. When finding that the environment context corresponding to the environment context identifier is lacking, the context awareness platform acquires, according to the environment context identifier, an environment context of a second user adjacent to the first user.

Exemplarily, if the context awareness platform finds that the environment context corresponding to the environment context identifier in the request, in the environment context record of the first user, is lacking, it indicates that the user equipment of the first user does not send the environment context corresponding to the environment context identifier to the context awareness platform. In this case, the context awareness platform may acquire the environment context of the second user adjacent to the first user.

The context awareness platform may acquire the environment context of the second user adjacent to the first user in two manners, which are described separately hereinafter.

I. First Manner:

The following processes may be included:

1. The context awareness platform sends, to the first user, a notification indicating that the environment context of the first user is lacking, where the notification carries the environment context identifier.

2. The context awareness platform receives the environment context that is acquired from the second user by the first user after reception of the notification and corresponding to the environment context identifier.

That the context awareness platform receives the environment context that is acquired from the second user by the first user after reception of the notification and corresponding to the environment context identifier, may include searching, by the first user, for a user adjacent to the first user after reception of the notification, initiating an environment context sharing request to the adjacent user that is searched out, where the environment context sharing request carries the environment context identifier, receiving the environment context that is returned by the second user adjacent to the first user and corresponding to the environment context identifier, and returning the received environment context to the context awareness platform.

It should be noted that users in this embodiment of the present disclosure perform interactions with each other using devices used by the users. For example, the first user uses the user equipment to search for a user adjacent to the first user. In a process of searching for an adjacent user, the adjacent user is determined by searching for an adjacent device.

II. Second Manner:

The following processes may be included:

1. The context awareness platform determines a user adjacent to the first user.

Exemplarily, the process may be implemented in the following manner:

The context awareness platform sends, to the first user, a notification indicating that the environment context of the first user is lacking, receives information that is returned by the first user after reception of the notification and about the user adjacent to the first user, and determines the user adjacent to the first user according to the information returned by the first user.

After receiving the notification, the user equipment of the first user may search for a device adjacent to the user equipment using a short-range communications technology, and return an identifier of the adjacent device that is searched out to the context awareness platform, for example, return a MAC address of the adjacent device that is searched out to the context awareness platform. The short-range communications technology includes but is not limited to technologies such as Bluetooth, WIFI, and NFC.

When there are multiple adjacent devices that are searched out, identifiers of the adjacent devices that are searched out may be returned in a form of a list to the context awareness platform. For example, the user equipment of the first user may sort, according to a preset rule, the adjacent devices that are searched out, and generate an adjacent user table of the first user. The preset rule may include but is not limited to signal strengths, physical distances, and the like. The generated adjacent user table is not further described herein, and for details, reference may be made to Table 1.

2. The context awareness platform performs a search using the environment context identifier, in an environment context record of the user adjacent to the first user.

It should be noted that, if the context awareness platform uses the MAC address of the device used by the user, as a user identifier in an environment context record, the context awareness platform may find a corresponding environment context record of the adjacent user directly according to the MAC address of the adjacent device that is returned by the first user. If the context awareness platform uses another identifier (for example, the E-mail address of the user) as the user identifier in the environment context record, the context awareness platform needs to find, in a prestored correspondence between the MAC address and the another identifier, the another identifier corresponding to the received MAC address, and then find the corresponding environment context record according to the found another identifier.

3. When finding that the second user adjacent to the first user has the environment context corresponding to the environment context identifier, acquire, from a context record of the second user, the environment context corresponding to the environment context identifier.

604. Return the acquired environment context to the application device.

The context awareness platform returns the acquired environment context to the application device, the application device may execute a corresponding application using the environment context, and return an execution result to the user equipment of the first user.

Further, to improve security, permission control may be performed on the environment context sharing between users. For example, the user may set a sharing permission for the environment context record of the user in the context awareness platform, to indicate whether the environment context record can be shared. Therefore, the environment context record of the user may further include the sharing permission.

Correspondingly, before the acquiring, from a context record of the second user, the environment context corresponding to the environment context identifier, the method may further include determining, by the context awareness platform, whether the second user sets environment context sharing, and after determining that the second user sets environment context sharing, executing the operation of acquiring, from a context record of the second user, the environment context corresponding to the environment context identifier.

In another embodiment of the present disclosure, the context awareness platform 20 may further confirm authenticity of adjacency of the first user and the second user. For example, before the acquiring, from a context record of the second user, the environment context corresponding to the environment context identifier, the method further includes confirming, by the context awareness platform, authenticity of adjacency of the first user and the second user, and after confirming that the first user and the second user are really adjacent, executing the operation of acquiring, from a context record of the second user, the environment context corresponding to the environment context identifier.

The confirming, by the context awareness platform, authenticity of adjacency of the first user and the second user, may include requesting, by the context awareness platform, from the second user, information about a user adjacent to the second user, receiving the information that is returned by the second user and about the user adjacent to the second user, and determining, by the context awareness platform, whether the information returned by the second user includes information about the first user, and if the information returned by the second user includes information about the first user, determining that the first user and the second user are really adjacent, or if the information returned by the second user does not include information about the first user, determining that the first user and the second user are not adjacent.

Generally, a motion range of the user within a short time is limited. Therefore, to reduce a quantity of searches for adjacent users and a quantity of interactions with adjacent users, in another embodiment of the present disclosure, the method may further include saving, by the context awareness platform, the acquired environment context of the second user to the environment context record of the first user as a temporary environment context of the first user, and setting a validity period for the temporary environment context.

A context awareness platform can acquire an environment context of a second user in a same environment as a first user, and provide, to the first user, an environment context lacked by the first user for accessing an application device such that the user may not be limited to smart space when acquiring the environment context lacked by the user, and therefore, this embodiment of the present disclosure has strong commonality.

Figure 7:
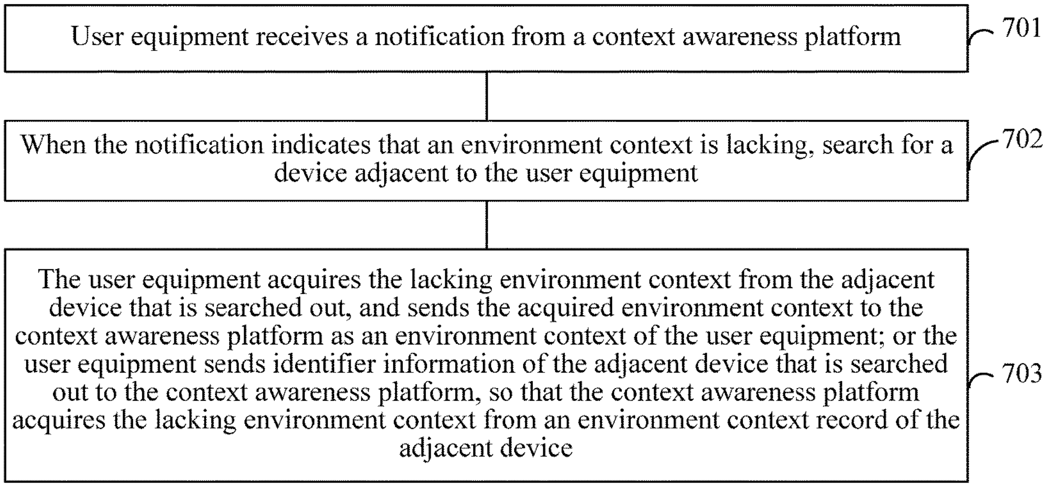
FIG. 7 is a flowchart of a method for sharing an environment context according to another embodiment of the present disclosure.

FIG. 7 shows a method for sharing an environment context according to another embodiment of the present disclosure. Referring to FIG. 7, the method includes the following steps:

701. User equipment receives a notification from a context awareness platform.

For example, if the context awareness platform finds, when querying an environment context record of a first user, that an environment context is lacking in the record, the context awareness platform sends, to the first user, a notification indicating that the environment context is lacking, where the notification is used to indicate that the environment context is lacking.

The notification may be implemented by extending an existing PUSH notification, for example, extending a field indicating that the environment context is lacking, in the PUSH notification. A special notification message for lacking of an environment context may be customized.

702. When the notification indicates that an environment context is lacking, search for a device adjacent to the user equipment.

If the notification is implemented by extending the existing PUSH notification, the user equipment may identify the notification according to an indication in the extended field. If a customization manner is used, the user equipment may identify the notification according to a name of a customized message.

The user equipment may acquire an identifier of an adjacent device in a same environment as the user equipment using a short-range communications technology. The short-range communications technology includes but is not limited to technologies such as Bluetooth, WIFI, and NFC.

703. The user equipment acquires the lacking environment context from the adjacent device that is searched out, and sends the acquired environment context to the context awareness platform as an environment context of the user equipment, or the user equipment sends identifier information of the adjacent device that is searched out to the context awareness platform such that the context awareness platform acquires the lacking environment context from an environment context record of the adjacent device.

The user equipment may send the lacking environment context acquired from the adjacent device to the environment context awareness platform, or may send the identifier information of the adjacent device to the context awareness platform, and the context awareness platform acquires the lacking environment context according to the received identifier information. The following describes specific implementation of the two manners in detail.

When the user equipment acquires the lacking environment context, the notification received by the user equipment carries the environment context identifier. That the user equipment acquires the lacking environment context from the adjacent device that is searched out may include initiating, by the user equipment, an environment context sharing request to the adjacent device that is searched out, where the environment context sharing request carries the environment context identifier, and receiving, by the user equipment, an environment context that is returned by the adjacent device and corresponding to the environment context identifier.

In another implementation manner, that the user equipment sends identifier information of the adjacent device that is searched out to the context awareness platform may include acquiring, by the user equipment, the identifier information of the adjacent device that is searched out, arranging the acquired identifier information according to a preset rule, and generating an ordered adjacent user table including the identifier information, and sending the adjacent user table to the context awareness platform.

The preset rule may include but is not limited to signal strengths, physical distances, and the like. The generated adjacent user table is not further described herein, and for details, reference may be made to Table 1. It can be known from the foregoing that, in the method for sharing an environment context according to this embodiment of the present disclosure, an environment context of an adjacent user in a same environment as a first user can be acquired, and an environment context lacked by the first user for accessing an application device is provided to the first user such that the user in non-smart space can also obtain the environment context lacked by the user, and therefore this embodiment of the present disclosure has strong commonality.

Figure 8:
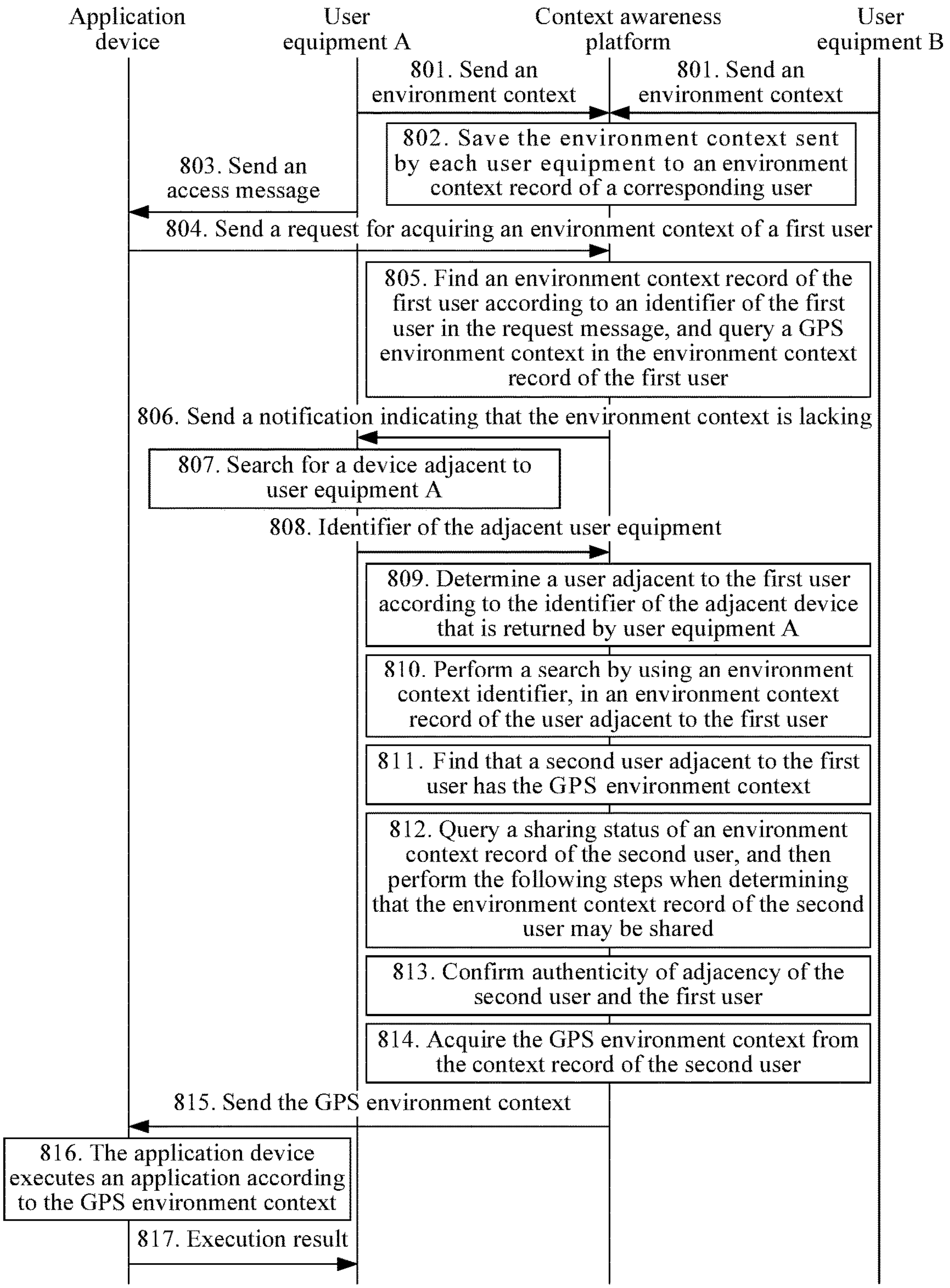
FIG. 8 is a flowchart of a method for sharing an environment context according to another embodiment of the present disclosure.

The following further describes in detail a method provided by an embodiment of the present disclosure, using a specific scenario. In this embodiment, it is assumed that an application scenario is an environment context that an application device accessed by a first user requests a context awareness platform to provide is a GPS environment context. Referring to FIG. 8, the method includes the following steps:

801. Each user equipment sends an environment context of the user equipment to a context awareness platform regularly or periodically.

802. The context awareness platform saves the environment context sent by each user equipment to an environment context record of a corresponding user.

If a user identifier used in the environment context record of the user is not an identifier of user equipment used by the user, the context awareness platform needs to maintain a correspondence between the user and the user equipment. A user may have multiple user equipments, and the user equipments may be terminal devices such as mobile phones. In this embodiment, assuming that the user identifier used in the environment context record of the user is an E-mail address of the user, and that the identifier of the device used by the user is a MAC address of the device, the correspondence between the user and the user equipment that is maintained by the context awareness platform is shown in Table 1, and is not further described herein.

The context awareness platform saves the environment context of each user equipment as an environment context record of the corresponding user according to the maintained correspondence between the user and the user equipment, and sets a sharing permission for the environment context record of each user.

803. User equipment A of a first user sends an access message to an application device.

The access message includes an identifier of the first user, to indicate, to the application device, the user accessing the application device such that the application device acquires an environment context required for executing an application accessed by the first user. In this embodiment, it is assumed that the environment context required by the first user for accessing the application is a GPS environment context.

804. The application device sends a request for acquiring an environment context of the first user to the context awareness platform.

The request message includes the identifier of the first user and an identifier of an environment context to be acquired, where the identifier of the first user may be in a form of an E-mail address, for example, usera@huawei.com. The environment context identifier is GPS.

805. The context awareness platform finds an environment context record of the first user according to an identifier of the first user in the request message, and queries a GPS environment context in the environment context record of the first user.

This embodiment is described using an example in which the first user lacks the GPS environment context. Therefore, step 806 is performed after step 805.

806. The context awareness platform sends, to user equipment A of the first user, a notification indicating that the environment context is lacking.

For example, if the context awareness platform finds, when querying the environment context record of the first user, that the GPS environment context does not exist in the record, the context awareness platform sends, to the first user, the notification indicating that the environment context is lacking. The notification may be implemented by extending an existing PUSH notification, for example, extending a field indicating that the environment context is lacking, in the PUSH notification. A special notification message for lacking of an environment context may be customized.

807. User equipment A searches for a device adjacent to user equipment A.

For example, user equipment A of the first user may acquire an identifier of adjacent user equipment in a same environment as user equipment A using a short-range communications technology. The short-range communications technology includes but is not limited to technologies such as Bluetooth, WIFI, and NFC.

It is assumed that identifiers of user equipments that are searched out and adjacent to user equipment A are respectively 80:b6:86:28:7a:c4 and 00:1c:a4:55:b6:8D.

User equipment A may arrange, according to a preset rule, the identifiers of the adjacent devices that are searched out, and generate an adjacent user table of the first user. The preset rule may include but is not limited to signal strengths, physical distances, and the like. The generated adjacent user table is not further described herein, and for details, reference may be made to Table 1.

808. User equipment A sends an identifier of the adjacent device that is searched out to the context awareness platform.

For example, user equipment A may send the adjacent user table shown in Table 1 to the context awareness platform.

809. The context awareness platform determines a user adjacent to the first user according to the identifier of the adjacent device that is returned by user equipment A.

The context awareness platform converts, according to the maintained correspondence between the user and the user equipment, the received identifier of the user equipment that is sent by user equipment A into an identifier used in the environment context record.

For example, the context awareness platform may convert the adjacent user table including MAC addresses shown in Table 1 into an adjacent user table including E-mail addresses. The adjacent user table after conversion is shown in Table 2.

810. The context awareness platform performs a search using an environment context identifier, in an environment context record of the user adjacent to the first user.

The context awareness platform acquires the environment context record of the determined adjacent user, and performs a search using the environment context identifier, in the environment context record of the user adjacent to the first user.

For example, the context awareness platform may sequentially query, according to the order in Table 2, the environment context records of the adjacent users shown in Table 2 for GPS environment contexts.

811. Find that a second user adjacent to the first user has the GPS environment context.

812. The context awareness platform queries a sharing status of an environment context record of the second user, and then performs the following steps when determining that the environment context record of the second user may be shared.

813. The context awareness platform confirms authenticity of adjacency of the second user and the first user.

The processes may be implemented by the following steps:

1. The context awareness platform requests, from the second user, information about a user adjacent to the second user.

After receiving a request message sent by the context awareness platform, user equipment B of the second user acquires identifiers of user equipments in a same environment as user equipment B using a short-range communications technology, arranges the identifiers of the user equipments in the same environment as user equipment B according to a preset rule, generates an adjacent user equipment table (referring to Table 3) of user equipment B, and sends the adjacent user equipment table to the context awareness platform. An address of user equipment A is Bc:76:70:9f:29:72.

TABLE 3

| Sequence number | Type | Identifier information of user equipment (MAC address) |
|---|---|---|
| 1 | Bluetooth | Bc:76:70:9f:29:72 |
| 2 | Bluetooth | 00:1c:a4:55:b6:8D |

2. The context awareness platform receives an identifier of user equipment adjacent to user equipment B of the second user that is returned by user equipment B.

In this embodiment, the context awareness platform converts, according to the maintained correspondence between the user and the user equipment, the adjacent user equipment table shown in Table 3 into an adjacent user table shown in Table 4.

TABLE 4

| Sequence number | User identifier information (Email address) |
|---|---|
| 1 | usera@huawei.com |
| 2 | userc@gmail.com |

3. The context awareness platform determines whether the information returned by the second user includes information about the first user, and if the information returned by the second user includes information about the first user, determines that the first user and the second user are really adjacent, or if the information returned by the second user does not include information about the first user, determines that the first user and the second user are not adjacent.

It may be determined, by querying the adjacent user table shown in Table 4, that the first user usera@huawei.com and the second user userb@huawei.com are in the same environment and are really adjacent.

814. Acquire the GPS environment context from the context record of the second user.

815. The context awareness platform sends the GPS environment context to the application device.

The context awareness platform may set the GPS environment context of the second user userb@huawei.com as a temporary GPS environment context of the first user usera@huawei.com, and set a validity period, for example, 300 seconds, and send the temporary GPS environment context to the application device.

816. The application device executes an application according to the GPS environment context.

817. The application device sends an execution result to user equipment A.

In this embodiment of the present disclosure, smart space may be used as a special type of user. A person skilled in the art may understand that, the first user in the smart space can also acquire, using the technical solution provided by this embodiment, the environment context lacked by the first user for accessing the application device. In this case, an adjacent device searched out by the first user may include smart space. User equipment A may acquire, using the short-range communications technology based on an RFID, an identifier of smart space in which user equipment A is located, and generate an adjacent user table of user equipment A.

For example, in this embodiment of the present disclosure, the identifier of the smart space may be indicated by RFID information of the smart space, where the RFID information may be a binary sequence of 512 bits. In the adjacent user equipment table of user equipment A shown in Table 5, the RFID of the smart space is indicated by id1.

TABLE 5

| Sequence number | Type | RFID information |
|---|---|---|
| 1 | RFID | id1 (binary sequence of 512 bits) |

It should be noted that for the smart space used as a special type of user, the first user in the smart space may distinguish different smart space using the RFID of the smart space. The context awareness platform may also use the RFID of the smart space as a user identifier of the smart space. The context awareness platform may also allocate, to the smart space, a unified user name (for example, may be a user name in a form of an E-mail) as a user identifier of the smart space in the context awareness platform, and then the context awareness platform maintains a correspondence between the RFID of the smart space and the user name.

Therefore, for a case in which the user is located in the smart space, the solution of the embodiment shown in FIG. 8 may also be used for implementation, which is not further described herein.

Figure 9:
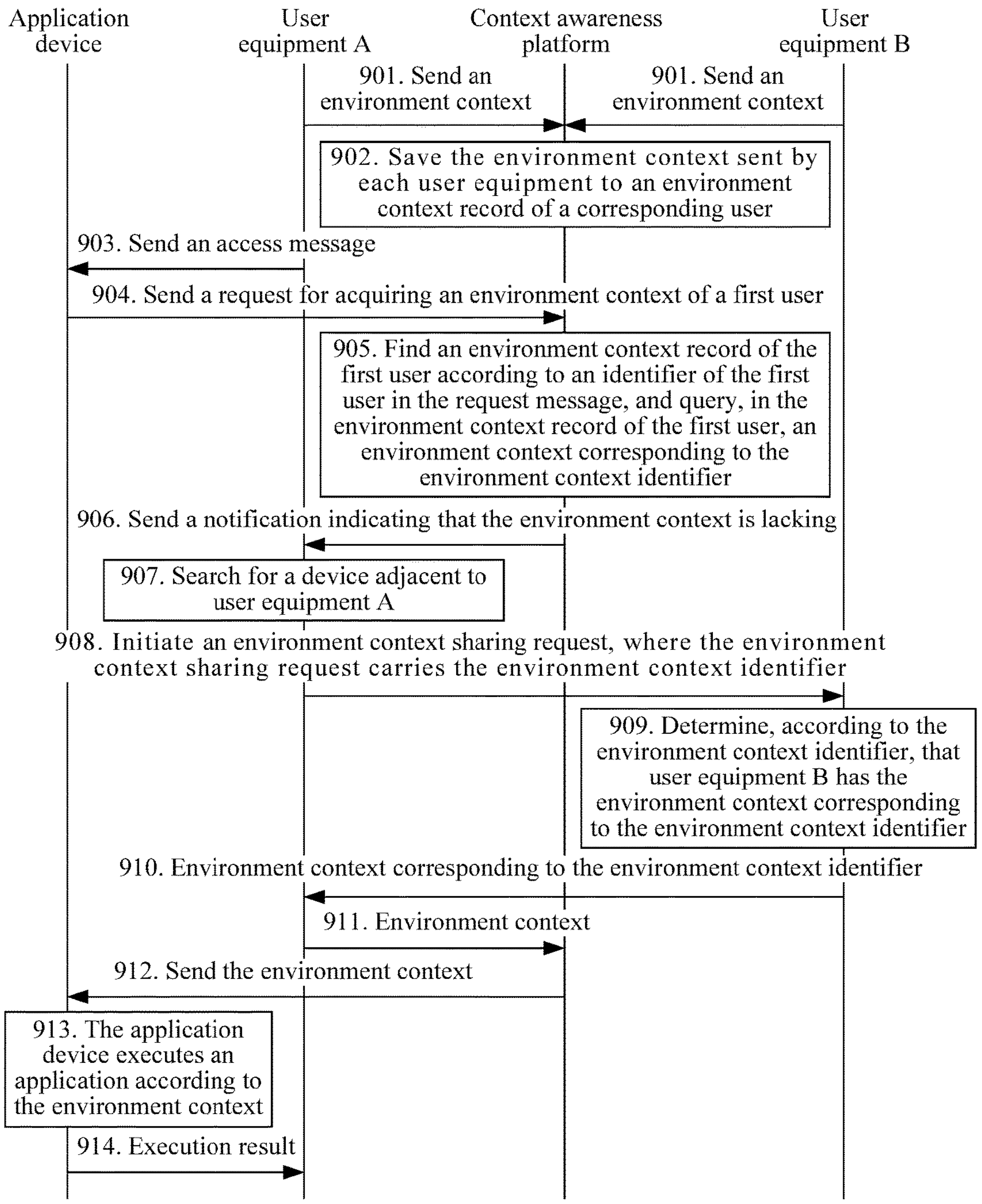
FIG. 9 is a flowchart of a method for sharing an environment context according to another embodiment of the present disclosure.

An embodiment of the present disclosure provides another method for sharing an environment context. An implementation principle of the method provided by this embodiment is the same as that of the embodiment shown in FIG. 8. Herein only differences are described correspondingly, and same parts are not further described in detail. As shown in FIG. 9, the method includes the following steps:

901. Each user equipment sends an environment context of the user equipment to a context awareness platform.

902. The context awareness platform saves the environment context sent by each user equipment to an environment context record of a corresponding user.

903. User equipment A of a first user sends an access message to an application device.

904. The application device sends a request for acquiring an environment context of the first user to the context awareness platform.

905. The context awareness platform finds an environment context record of the first user according to an identifier of the first user in the request message, and queries, in the environment context record of the first user, an environment context corresponding to an environment context identifier.

906. The context awareness platform sends, to user equipment A of the first user, a notification indicating that the environment context is lacking.

The notification includes an identifier of a lacking environment context.

907. User equipment A searches for a device adjacent to user equipment A after reception of the notification.

908. Initiate an environment context sharing request to the adjacent device that is searched out, where the environment context sharing request carries the environment context identifier.

User equipment A may send the environment context sharing request to the adjacent device using a short-range communications technology.

909. The adjacent device determines, according to the environment context identifier, that the adjacent device has the environment context corresponding to the environment context identifier.

If it is determined that the device does not have the environment context corresponding to the environment context identifier, the request is ignored.

If it is determined that the device has the environment context corresponding to the environment context identifier, the device continues to determine whether the environment context corresponding to the environment context identifier is set to a shared state, and if the environment context is set to the shared state, returns the environment context corresponding to the environment context identifier to user equipment A.

For ease of description, in this embodiment of the present disclosure, an adjacent user providing an environment context to the first user is referred to as a second user. Then, an adjacent device providing an environment context to the first user is a device used by the second user.

910. User equipment A receives an environment context that is returned by a device of the second user and corresponding to the environment context identifier.

911. Return the received environment context to the context awareness platform.

912. The context awareness platform sends the environment context to the application device.

913. The application device executes an application according to the environment context.

914. The application device sends an execution result to user equipment A.

It can be known from the foregoing that, a context awareness platform can acquire an environment context of a second user in a same environment as a first user, and provide, to the first user, an environment context lacked by the first user for accessing an application device such that the user may not be limited to smart space when acquiring the environment context lacked by the user, and therefore, this embodiment of the present disclosure has strong commonality.

Figure 10:
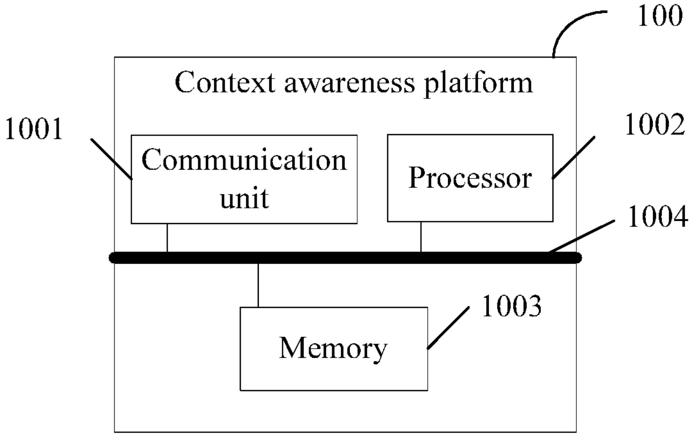
FIG. 10 is a structural diagram of hardware of a context awareness platform according to an embodiment of the present disclosure.

FIG. 10 is a structural diagram of hardware of a context awareness platform 100 according to an embodiment of the present disclosure, where the context awareness platform includes at least one communication unit 1001, a processor 1002, a memory 1003, and a bus 1004, where the at least one communication unit 1001, the processor 1002, and the memory 1003 are connected by the bus 1004 and implement mutual communication.

The bus 1004 may be an industry standard architecture (ISA) bus, a Peripheral Component Interconnect (PCI) bus, or an Extended Industry Standard Architecture (EISA) bus, or the like. The bus 1004 may be categorized as an address bus, a data bus, a control bus, or the like. For ease of indicating, the bus in FIG. 10 is indicated by only a bold line, but it does not mean that only one bus or one type of bus exists.

The memory 1003 is configured to store executable program code, where the program code includes a computer operation instruction. The memory 1003 may include a high-speed Random-access Memory (RAM), or may further include a non-volatile memory (non-volatile memory), for example, at least one magnetic disk storage. The storage device stores an operating system and an application program, and is configured to implement the program code in this embodiment of the present disclosure. The operating system is configured to control and implement a processing function executed by a processing unit. The application program includes program code, such as word processing software and email software. In this embodiment of the present disclosure, the memory 1003 may store program code that can implement a function of the processor 1002, and an environment context record of a user.

The processor 1002 may be a Central Processing Unit (CPUt), or an Application-Specific Integrated Circuit (ASIC), or is configured as one or more integrated circuits for implementing this embodiment of the present disclosure.

The communication unit 1001 is configured to perform communication with an external device, and may be configured to receive a request for acquiring an environment context of a first user, where the request is initiated by an application device and includes an identifier of the first user and an environment context identifier.

The first user may access the application device using user equipment of the first user. The application device may send the request for acquiring the environment context of the first user to the context awareness platform. The request includes the identifier of the first user and the environment context identifier.

An identifier of a user is used to distinguish identification information of different users, and may uniquely identify a user in the context awareness platform. The identifier of the user may be in different forms, including but not limited to an identifier of user equipment used by the user to perform an interaction with the context awareness platform (for example, a MAC address of the user equipment), or a user name that cannot be duplicated (for example, an (E-mail) address of the user), or a RFID, or the like. The user may access the context awareness platform using different forms of user identifiers. In this case, the context awareness platform may save correspondence between different forms of user identifiers of each user. For example, when the context awareness platform uses an E-mail address of each user to organize an environment context record of the user, the context awareness platform may further save a correspondence between the E-mail of the user and a MAC address of user equipment used by the user. In this way, when the user uses the MAC address of the user equipment to perform access, the context awareness platform may find, according to the correspondence, the E-mail address corresponding to the MAC address of the user equipment in order to find the environment context record corresponding to the E-mail address. A person skilled in the art may understand that the foregoing forms are only implementation forms of user identifiers, and that a user may be distinguished using different types of identifiers.

Similarly, the environment context identifier is used to distinguish different types of environment contexts, and generally may be directly indicated by an environment context type, for example, GPS, humidity, temperature, height, air pressure, noise, or the like.

Therefore, it can be known from the foregoing that, the request for acquiring the environment context of the first user may indicate, to the context awareness platform, which environment context of which user is requested by the application device.

The processor 1002 is configured to find an environment context record of the first user according to the identifier of the first user, query, in the environment context record of the first user, an environment context corresponding to the environment context identifier, and when finding that the environment context corresponding to the environment context identifier is lacking, acquire, according to the environment context identifier, an environment context of a second user adjacent to the first user.

The environment context record of each user may include an identifier of the user, an environment context identifier, and an environment context corresponding to the environment context identifier. The environment context record of the user may be saved in a database or a file, which is not limited by this embodiment of the present disclosure.

It should be noted that the environment context record of the user may be collected and recorded by the context awareness platform beforehand. A collection manner may be that the context awareness platform queries the user equipment regularly, or may be that the user equipment reports to the context awareness platform regularly.

It should be noted that, smart space may be used as a special type of user managed by the context awareness platform, where an awareness device in the smart space may send an acquired environment context to the context awareness platform, and the context awareness platform may generate an environment context record of the smart space.

The processor 1002 may query the environment context record of the first user according to the user identifier in the request, and further query, in the environment context record of the first user, the environment context corresponding to the environment context identifier in the request.

Exemplarily, if the processor 1002 finds that the environment context corresponding to the environment context identifier in the request, in the environment context record of the first user, is lacking, it indicates that the user equipment of the first user does not send the environment context corresponding to the environment context identifier to the context awareness platform. In this case, the processor 1002 may acquire the environment context of the second user adjacent to the first user.

The processor 1002 may acquire the environment context of the second user adjacent to the first user in two manners, which are described separately hereinafter.

I. First Manner:

The following processes may be included:

1. The processor 1002 sends, to the first user using the communication unit 1001, a notification indicating that the environment context of the first user is lacking, where the notification carries the environment context identifier.

The environment context identifier carried in the notification is an identifier of an environment context lacked by the first user.

After receiving the notification, the user equipment of the first user may search for a device adjacent to the user equipment of the first user, for example, may acquire, using a short-range communications technology, an identifier of an adjacent device in a same environment as the user equipment of the first user, where the short-range communications technology includes but is not limited to technologies such as Bluetooth, WIFI, and NFC.

After searching out the adjacent device, the user equipment of the first user initiates an environment context sharing request to the adjacent device that is searched out. The environment context sharing request carries the environment context identifier received from the context awareness platform. The user equipment of the first user may send, using the short-range communications technology, the environment context sharing request to the adjacent device in the same environment as the first user.

The device that receives the environment context sharing request determines, according to the environment context identifier carried in the request, whether the device has the environment context corresponding to the environment context identifier.

If it is determined that the device does not have the environment context corresponding to the environment context identifier, the request is ignored.

If it is determined that the device has the environment context corresponding to the environment context identifier, the environment context corresponding to the environment context identifier may be sent to the user equipment of the first user.

For ease of description, in this embodiment of the present disclosure, an adjacent user providing an environment context to the first user is referred to as a second user. Then, an adjacent device providing an environment context to the first user is a device used by the second user.

2. The processor 1002 receives, using the communication unit 1001, the environment context that is acquired from the second user by the first user after reception of the notification and corresponding to the environment context identifier.

After the device of the second user that is searched out determines that the device has the environment context corresponding to the received environment context identifier, the device sends the environment context corresponding to the environment context identifier to the user equipment of the first user. The user equipment of the first user sends the received environment context to the communication unit 1001 of the context awareness platform, and the processor 1002 of the context awareness platform receives, using the communication unit 1001, the environment context sent by the user equipment of the first user.

II. Second Manner:

The following process may be included: The processor 1002 determines, using the communication unit 1001, a user adjacent to the first user, performs a search using the environment context identifier carried in the request sent by the application device, in an environment context record of the user adjacent to the first user, and after finding that the second user adjacent to the first user has the environment context corresponding to the environment context identifier, acquires, from a context record of the second user, the environment context corresponding to the environment context identifier. The process may be implemented by the following steps:

1. The processor 1002 determines, using the communication unit 1001, the user adjacent to the first user.

Exemplarily, the process may be implemented in the following manner:

The processor 1002 sends, to the first user using the communication unit 1001, a notification indicating that the environment context of the first user is lacking, and receives, using the communication unit 1001, information that is returned by the first user after reception of the notification and about the user adjacent to the first user. The information about the user adjacent to the first user may be an identifier of a device used by the adjacent user.

After receiving the notification, the user equipment of the first user may search for a device adjacent to the user equipment using a short-range communications technology, and return an identifier of the adjacent device that is searched out to the communication unit 1001, for example, return a MAC address of the adjacent device that is searched out to the communication unit 1001. The short-range communications technology includes but is not limited to technologies such as Bluetooth, WIFI, and NFC.

When there are multiple adjacent devices that are searched out, identifiers of the adjacent devices that are searched out may be returned in a form of a list to the communication unit 1001. For example, the user equipment of the first user may sort, according to a preset rule, the adjacent devices that are searched out, and generate an adjacent user table of the first user. The preset rule may include but is not limited to signal strengths, physical distances, and the like. It is assumed that the user equipment of the first user searches out two adjacent devices, where identifiers (MAC addresses are used as an example herein) of the adjacent devices that are searched out are respectively 80:b6:86:28:7a:c4 and 00:1c:a4:55:b6:8D. A signal strength of the device with the identifier 80:b6:86:28:7a:c4 is higher than a signal strength of the device with the identifier 00:1c:a4:55:b6:8D. An adjacent user table that is obtained after sorting is performed in descending order of signal strengths is not further described herein, and for details, reference may be made to Table 1.

The processor 1002 determines the user adjacent to the first user according to the information returned by the first user and received by the communication unit 1001.

It should be noted that, if a user identifier used by the context awareness platform for organizing an environment context of the user is the identifier of the device used by the user, the processor 1002 may find a corresponding environment context record of the adjacent user directly according to the identifier of the device that is received by the communication unit 1001.

If the user identifier used by the context awareness platform for organizing the environment context of the user is not the identifier of the device used by the user, for example, an E-mail address is used as the user identifier, the processor 1002 may find, in a prestored correspondence between the user identifier and the identifier of the device used by the user, the user identifier corresponding to the identifier of the device that is received by the communication unit 1001, and then find the corresponding environment context record according to the found user identifier.

For example, the processor 1002 may convert the received identifier of the device of the adjacent user that is sent by the user equipment into the user identifier of the adjacent user according to the correspondence between the user identifier and the identifier of the device used by the user.

For example, the context awareness platform may convert the adjacent user table shown in Table 1 into an adjacent user table expressed using user identifiers. If an identifier of a user corresponding to the user equipment with the MAC address 80:b6:86:28:7a:c4, in the context awareness platform is userb@huawei.com, and an identifier of a user corresponding to the user equipment with the MAC address 00:1c:a4:55:b6:8D, in the context awareness platform is userc@gmail.com, obtained user identifiers may be shown in Table 2, which is not further described herein.

2. The processor 1002 searches for an environment context record corresponding to the user identifier in Table 2, and searches, in the found environment context record, the environment context corresponding to the environment context identifier.

For example, the processor 1002 may sequentially query, according to the order in Table 2, in the environment context records of the adjacent users shown in Table 2, environment contexts corresponding to environment context identifiers.

3. When finding that the second user adjacent to the first user has the environment context corresponding to the environment context identifier, the processor 1002 acquires, from a context record of the second user, the environment context corresponding to the environment context identifier.

The communication unit 1001 is further configured to return the environment context acquired by the processor 1002 to the application device.

The communication unit 1001 returns the acquired environment context to the application device. The application device may execute a corresponding application using the environment context, and return an execution result to the user equipment of the first user.

In another embodiment of the present disclosure, the user may set a sharing permission for the environment context record of the user in the context awareness platform 100, to indicate whether the environment context record can be shared. Therefore, the environment context record of the user may further include the sharing permission.

Further, the processor 1002 may be further configured to determine whether the second user sets environment context sharing, and after determining that the second user sets environment context sharing, execute the operation of acquiring, from a context record of the second user, the environment context corresponding to the environment context identifier.

In another embodiment of the present disclosure, the context awareness platform 100 may further confirm authenticity of adjacency of the first user and the second user.

Further, the processor 1002 may be further configured to confirm authenticity of adjacency of the first user and the second user, and after confirming that the first user and the second user are really adjacent, execute the operation of acquiring, from a context record of the second user, the environment context corresponding to the environment context identifier.

The processor 1002 may confirm authenticity of adjacency of the first user and the second user in the following manners: requesting, from the second user using the communication unit 1001, information about a user adjacent to the second user, receiving, from the second user using the communication unit 1001, the information that is returned by the second user and about the user adjacent to the second user, determining whether the information returned by the second user includes information about the first user, and if the information returned by the second user includes information about the first user, determining that the first user and the second user are really adjacent, or if the information returned by the second user does not include information about the first user, determining that the first user and the second user are not adjacent.

Generally, a motion range of the user within a short time is limited. Therefore, to reduce a quantity of searches for adjacent users and a quantity of interactions with adjacent users, in another embodiment of the present disclosure, further, the processor 1002 is further configured to save the acquired environment context of the second user to the environment context record of the first user as a temporary environment context of the first user, and set a validity period for the temporary environment context.

It can be known from the foregoing that, a context awareness platform can acquire an environment context of a second user in a same environment as a first user, and provide, to the first user, an environment context lacked by the first user for accessing an application device such that the user may not be limited to smart space when acquiring the environment context lacked by the user, and therefore, this embodiment of the present disclosure has strong commonality.

Figure 11:
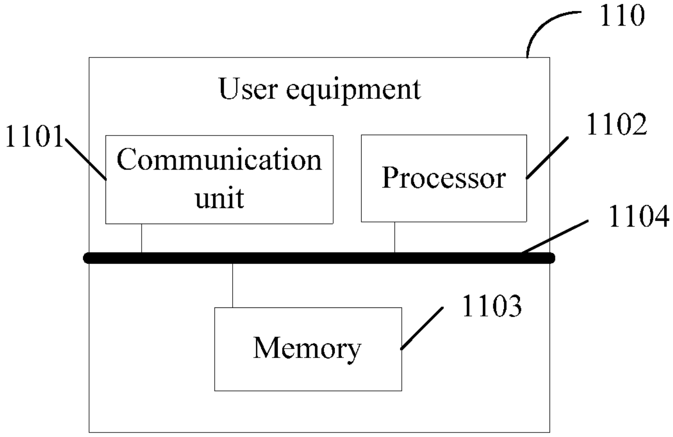
FIG. 11 is a structural diagram of hardware of user equipment according to an embodiment of the present disclosure.

FIG. 11 is a structural diagram of hardware of user equipment 110 according to an embodiment of the present disclosure, where the user equipment 110 includes at least one communication unit 1101, a processor 1102, a memory 1103, and a bus 1104, where the at least one communication unit 1101, the processor 1102, and the memory 1103 are connected by the bus 1104 and implement mutual communication.

The bus 1104 may be an ISA bus, a PCI bus, an EISA bus, or the like. The bus 1104 may be categorized as an address bus, a data bus, a control bus, or the like. For ease of indicating, the bus in FIG. 11 is indicated by only a bold line, but it does not mean that only one bus or one type of bus exists.

The memory 1103 is configured to store executable program code, where the program code includes a computer operation instruction. The memory 1103 may include a high-speed RAM memory, or may further include a non-volatile memory (non-volatile memory), for example, at least one magnetic disk storage. The storage device stores an operating system and an application program, and is configured to implement the program code in this embodiment of the present disclosure. The operating system is configured to control and implement a processing function executed by a processing unit. The application program includes program code, such as word processing software and E-mail software. In this embodiment of the present disclosure, the memory 1103 is configured to store program code for implementing a function of the processor 1102.

The processor 1102 may be a CPU, or an ASIC, or is configured as one or more integrated circuits for implementing this embodiment of the present disclosure.

The communication unit 1101 is configured to perform communication with an external device, and is configured to receive a notification from a context awareness platform, and when identifying that the notification is a notification indicating that an environment context is lacking, trigger the processor 1102 to process. The communication unit 1101 may be further configured to communicate with other user equipment.

For example, if the context awareness platform finds, when querying an environment context record of a first user, that an environment context is lacking in the record, the context awareness platform sends, to user equipment of the first user, a notification indicating that the environment context is lacking.

The notification may be implemented by extending an existing PUSH notification, for example, extending a field indicating that the environment context is lacking, in the PUSH notification. A special notification message for lacking of an environment context may be customized.

If the notification is implemented by extending the existing PUSH notification, the communication unit 1101 may identify the notification according to an indication in the extended field. If a customization manner is used, the communication unit 1101 may identify the notification according to a name of a customized message.

The processor 1102 is configured to search for a device adjacent to the user equipment, and acquire the lacking environment context from the adjacent device that is searched out.

For example, the processor 1102 may acquire, using the communication unit 1101, an identifier of an adjacent device in a same environment as the user equipment using a short-range communications technology.

The short-range communications technology includes but is not limited to technologies such as Bluetooth, WIFI, and NFC.

The processor 1102 acquires the lacking environment context from the adjacent device that is searched out.

The processor 1102 sends the acquired environment context to the context awareness platform using the communication unit 1101, or sends identifier information of the adjacent device that is searched out by the processor 1102 to the context awareness platform using the communication unit 1101 such that the context awareness platform acquires the lacking environment context from an environment context record of a user corresponding to the identifier information.

It should be noted that the processor 1102 has two different implementation manners. A person skilled in the art may select either one of the manners in this embodiment of the present disclosure for implementation as required. The two manners are described separately in detail hereinafter.

When the processor 1102 is configured to acquire the lacking environment context from the adjacent device that is searched out, the processor 1102 is configured to initiate, using the communication unit 1101, an environment context sharing request to the adjacent device that is searched out, where the environment context sharing request carries the environment context identifier, receive, using the communication unit 1101, an environment context that is returned by the adjacent device and corresponding to the environment context identifier, and send the acquired environment context to the context awareness platform as the environment context of the user equipment using the communication unit 1101.

It should be noted that in the foregoing manner, the notification sent by the context awareness platform to the user equipment 110 needs to carry the environment context identifier.

When the processor 1102 is configured to send the identifier information of the adjacent device that is searched out to the context awareness platform, the processor 1102 is configured to acquire the identifier information of the adjacent device that is searched out, arrange the acquired identifier information according to a preset rule, and generate an ordered adjacent user table including the identifier information, and send the adjacent user table to the context awareness platform using the communication unit 1101.

A MAC address of the adjacent device may be used as the identifier information of the adjacent device. The preset rule may include but is not limited to signal strengths, physical distances, and the like. The adjacent user table generated by the communication unit 1101 is not further described herein, and for details, reference may be made to Table 1.

It can be known from the foregoing that, user equipment 110 in this embodiment of the present disclosure may acquire a lacking environment context from an adjacent device in order to provide the lacking environment context to a context awareness platform. Alternatively, user equipment 110 may choose to send identifier information of an adjacent device to a context awareness platform such that the context awareness platform can acquire a lacking environment context from an environment context record of the adjacent device to the user equipment. Therefore, environment context sharing between adjacent users in a same environment is implemented, and a limitation on acquisition of an environment context is reduced.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a Read-only Memory (ROM), a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for sharing an environment context implemented by a context awareness platform device in a network, comprising:

receiving, by a receiver of a context awareness platform device from a first application device of a first user, a request for acquiring an environment context describing an environment in which the first application device is located, the request comprising an identifier identifying the first user and an environment context identifier identifying the environment context that is absent from the first application device;

searching, by a processor of the context awareness platform device, for an environment context record of the first user according to the identifier of the first user;

searching, in the environment context record of the first user stored in a memory of the context awareness platform device, for the environment context corresponding to the environment context identifier, wherein the environment context identifies a second application device of a second user;

sending, by a transmitter of the context awareness platform to the second application device, a request for information regarding one or more devices adjacent to the second application device;

receiving, by the receiver of the context awareness platform from the second application device, the information regarding one or more devices adjacent to the second application device;

determining, by the processor of the context awareness platform, that the information returned by the second application device comprises information regarding the first application device, confirming that the first application device and the second application device are adjacent;

acquiring, by the processor of the context awareness platform device, the environment context of the second application device that is adjacent to the first application device of the first user; and transmitting, by a transmitter of the context awareness platform device, the environment context to the first application device.

2. The method according to claim 1, wherein acquiring, by the processor of the context awareness platform device according to the environment context identifier, the environment context of the second application device, comprises:

determining, by the processor of the context awareness platform device, the second application device adjacent to the first application device, performing, by the processor of the context awareness platform device, a search using the environment context identifier in a second environment context record of the second application device; and acquiring, by the processor of the context awareness platform device from the second environment context record of the second user, the environment context corresponding to the environment context identifier in response to the second environment context record storing the environment context corresponding to the environment context identifier.

3. The method according to claim 2, wherein before acquiring, by the processor of the context awareness platform device from the environment context record of the second user, the environment context corresponding to the environment context identifier, the method further comprises determining, by the processor of the context awareness platform device, that the second application device of the second user sets environment context sharing.

4. The method according to claim 1, wherein acquiring, by the processor of the context awareness platform device according to the environment context identifier, the environment context of the second application device comprises:

sending, by the transmitter of the context awareness platform device to the first application device, a notification indicating that the environment context of the first application device is lacking, wherein the notification comprises the environment context identifier; and receiving, by the receiver of the context awareness platform device, the environment context corresponding to the environment context identifier after sending the notification to the first application device.

5. The method according to claim 4, wherein the environment context is received after the first application device initiates an environment context sharing request with the second application device, wherein the environment context sharing request comprises the environment context identifier.

6. The method according to claim 1, wherein the method further comprises:

saving, in the memory of the context awareness platform device, the environment context of the second application device to the environment context record of the first user as a temporary environment context of the first user; and setting, by the processor of the context awareness platform device, a validity period for the temporary environment context.

7. A method for sharing an environment context implemented by a user equipment in a network, comprising:

transmitting, by a transmitter of the user equipment to a context awareness platform device, a request for acquiring an environment context describing an environment in which the user equipment is located, the request comprising an identifier identifying the first user and an environment context identifier identifying the environment context that is absent from the user equipment;

receiving, by a receiver of the user equipment from the context awareness platform device, a notification indicating that the environment context for the user equipment is absent from context awareness platform device, the environment context describing an environment in which the user equipment is located;

searching, by a processor of the user equipment, for a second device that is adjacent to the user equipment in response to the notification indicating that the environment context for the user equipment is absent from context awareness platform device;

sending, by a transmitter of the user equipment to the second device, a request for information regarding one or more devices adjacent to the second device;

receiving, by the receiver of the user equipment from the second device, the information regarding one or more devices adjacent to the second device;

determining, by the processor of the user equipment, that the information returned by the second device comprises information regarding the user equipment, confirming that the user equipment and the second device are adjacent;

receiving, by the receiver of the user equipment, the environment context from the second device; and sending, by the transmitter of the user equipment, the environment context to the context awareness platform device as the environment context of the user equipment.

8. The method according to claim 7, wherein the notification comprises an environment context identifier, and wherein receiving, by the receiver of the user equipment, the environment context from the adjacent device comprises:

initiating, by the processor of the user equipment, an environment context sharing request to the second device, wherein the environment context sharing request comprises the environment context identifier; and receiving, by the receiver of the user equipment, the environment context corresponding to the environment context identifier from the second device.

9. A context awareness platform device, comprising:

a receiver configured to receive a request for acquiring an environment context describing an environment in which a first application device of a first user is located from the first application device, the request being initiated by the first application device and comprising an identifier identifying the first user and an environment context identifier identifying the environment context that is absent from the first application device; and a processor coupled to the receiver and configured to:

determine an environment context record of the first user according to the identifier, of the first user, search for the environment context corresponding to the environment context identifier in the environment context record of the first user, wherein the environment context identifies a second application device of a second user; and send, to the second application device, a request for information regarding one or more devices adjacent to the second application device;

receive, from the second application device, the information regarding one or more devices adjacent to the second application device;

determine that the information returned by the second application device comprises information regarding the first application device, confirming that the first application device and the second application device are adjacent;

acquire the environment context of the second application device of the second user that is adjacent to the first application device of the first user; and a transmitter configured to transmit the environment context of the second application device to the first application device.

10. The context awareness platform device according to claim 9, wherein the processor is further configured to:

determine the second application device adjacent to the first application device;

perform a search using the environment context identifier in the environment context record of the second application device; and acquire, from the environment context record of the second user, the environment context corresponding to the environment context identifier in response to the second environment context record storing environment context corresponding to the environment context identifier.

11. The context awareness platform device according to claim 10, wherein the processor is further configured to determine that the second application device of the second user sets environment context sharing.

12. The context awareness platform device according to claim 9, wherein the transmitter is further configured to send a notification indicating that the environment context of the first application device is absent, wherein the notification comprises the environment context identifier, and wherein the receiver is further configured to receive the environment context corresponding to the environment context identifier after receiving the notification.

13. The context awareness platform device according to claim 9, wherein the processor is further configured to:

save the environment context of the second application device to the environment context record of the first user as a temporary environment context of the first user; and set a validity period for the temporary environment context.

14. A user equipment, comprising:

a transmitter configured to transmit a request acquiring an environment context describing an environment in which the user equipment is located to a context awareness platform device, the request comprising an identifier identifying the first user and an environment context identifier identifying the environment context that is absent from the user equipment;

a receiver configured to receive a notification indicating that the context awareness platform device lacks an environment context for the user equipment from the context awareness platform device, the environment context describing an environment in which the user equipment is located;

a processor coupled to the transmitter and the receiver; and a memory coupled to the processor in which a computer program is stored, the computer program including instructions that, when executed by the processor, cause the processor to search for a second device that is geographically adjacent to the user equipment in response to the notification indicating that the environment context for the user equipment is absent from the context awareness platform device, wherein the transmitter is further configured to send, to the second device, a request for information regarding one or more devices adjacent to the second device, wherein the receiver is further configured to receive, from the second device, the information regarding one or more devices adjacent to the second device, wherein the instructions, when executed by the processor, further cause the processor to determine that the information returned by the second device comprises information regarding the user equipment, confirming that the user equipment and the second device are adjacent, wherein the receiver is further configured to receive the environment context from the second device, and wherein the transmitter is further configured to send the environment context received from the second device to the context awareness platform device as the environment context of the user equipment.

15. The user equipment according to claim 14, wherein the notification comprises an environment context identifier, wherein the instructions that, when executed by the processor, further cause the processor to initiate an environment context sharing request to the second device that is searched out, wherein the environment context sharing request carries the environment context identifier, and wherein the receiver is further configured to receive the environment context that is returned by the second device and corresponding to the environment context identifier.

* * * * *